(12) United States Patent
Salmela et al.

(10) Patent No.: US 9,286,100 B2
(45) Date of Patent: Mar. 15, 2016

(54) VIRTUAL MACHINE MIGRATION USING 3GPP MCIM

(75) Inventors: Patrik Salmela, Espoo (FI); Kristian Slavov, Espoo (FI); Jukka Ylitalo, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/368,360

(22) PCT Filed: Dec. 29, 2011

(86) PCT No.: PCT/EP2011/074264
§ 371 (c)(1),
(2), (4) Date: Jun. 24, 2014

(87) PCT Pub. No.: WO2013/097903
PCT Pub. Date: Jul. 4, 2013

(65) Prior Publication Data
US 2014/0325515 A1    Oct. 30, 2014

(51) Int. Cl.
*G06F 9/455* (2006.01)
*G06F 9/48* (2006.01)

(52) U.S. Cl.
CPC .......... *G06F 9/45533* (2013.01); *G06F 9/4856* (2013.01)

(58) Field of Classification Search
CPC .... G06F 8/64; G06F 9/44542; G06F 9/45533
USPC ...................... 717/136, 147; 718/1
See application file for complete search history.

(56) References Cited

U.S. PATENT DOCUMENTS

| 7,203,944 | B1* | 4/2007 | van Rietschote et al. ..... 718/104 |
| 7,925,850 | B1* | 4/2011 | Waldspurger et al. ........ 711/162 |
| 8,615,579 | B1* | 12/2013 | Vincent et al. ................. 709/224 |
| 2008/0104587 | A1* | 5/2008 | Magenheimer et al. .......... 718/1 |
| 2009/0089860 | A1* | 4/2009 | Forrester et al. ................... 726/3 |
| 2010/0332635 | A1* | 12/2010 | Rogel et al. ..................... 709/223 |
| 2011/0055377 | A1* | 3/2011 | Dehaan .......................... 709/224 |
| 2011/0142053 | A1* | 6/2011 | Van Der Merwe et al. .......................... 370/395.1 |
| 2011/0197039 | A1* | 8/2011 | Green et al. .................. 711/162 |
| 2011/0258481 | A1* | 10/2011 | Kern .............................. 714/4.1 |
| 2012/0096459 | A1* | 4/2012 | Miyazaki .......................... 718/1 |

(Continued)

FOREIGN PATENT DOCUMENTS

| EP | 2 043 320 A1 | 4/2009 |
| WO | WO 2013/097901 A1 | 7/2013 |
| WO | WO 2013/097902 | 7/2013 |

OTHER PUBLICATIONS

Li et al., "HyperMIP: Hypervisor controlled Mobile IP for Virtual Machine Live Migration across Networks", 2008.*

(Continued)

*Primary Examiner* — Phillip H Nguyen
(74) *Attorney, Agent, or Firm* — Myers Bigel & Sibley, P.A.

(57) ABSTRACT

A method of migrating a virtual machine comprises a first manager, managing a first computing environment (such as a computing cloud), initiates migration of a virtual machine currently executing on a first vM2ME (virtual machine-to-machine equipment) in the first computing environment to a second computing environment (such as another computing cloud). Once the VM has migrated, the first manager disables execution of the first vM2ME.

40 Claims, 15 Drawing Sheets

Request new vM2ME    1401

↓

Confirmation of new MCIM    1402

↓

Initiate migration    1403

↓

Disable first vM2ME    1404

↓

Activate new vM2ME    1405

↓

Release old vM2ME    1406

↓

Block/discard old MCIM    1407

(56) References Cited

U.S. PATENT DOCUMENTS

2012/0110574 A1* 5/2012 Kumar .............................. 718/1
2013/0031544 A1* 1/2013 Sridharan et al. ................. 718/1

OTHER PUBLICATIONS

Berl et al., "Network Virtualization in Future Home Environments", 2009.*
International Search Report for PCT Application No. PCT/EP2011/074264 mailed Nov. 19, 2012, 4 pages.
Written Opinion of the International Searching Authority for PCT Application No. PCT/EP2011/074264 mailed Nov. 19, 2012, 7 pages.
3GPP TR 33.812 V9.2.0 (Jun. 2010) $3^{rd}$ Generation Partnership Project; Technical Specification Group Services and System Aspects; Feasibility study on the security aspects of remote provisioning ad change of subscription for Machine to Machine (M2M) equipment (Release 9); 650 Route des Lucioles, Sophia Antipolis, Valbonne, France; 87 pages.
3GPP TS 23.401 V12.4.0 (Mar. 2014) $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 12); 302 pages.
3GPP TS 23.402 V12.4.0 (Mar. 2014) $3^{rd}$ Generation Partnership Project; Technical Specification Group Services and System Aspects; Architecture enhancements for non-3GPP accesses (Release 12); 650 Route des Lucioles, Sophia Antipolis, Valbonne, France; 288 pages.

* cited by examiner

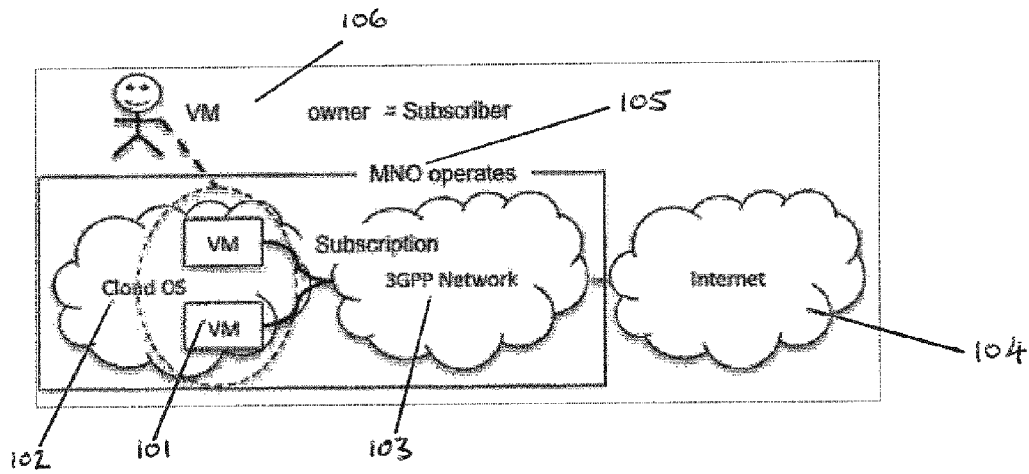
Figure 1
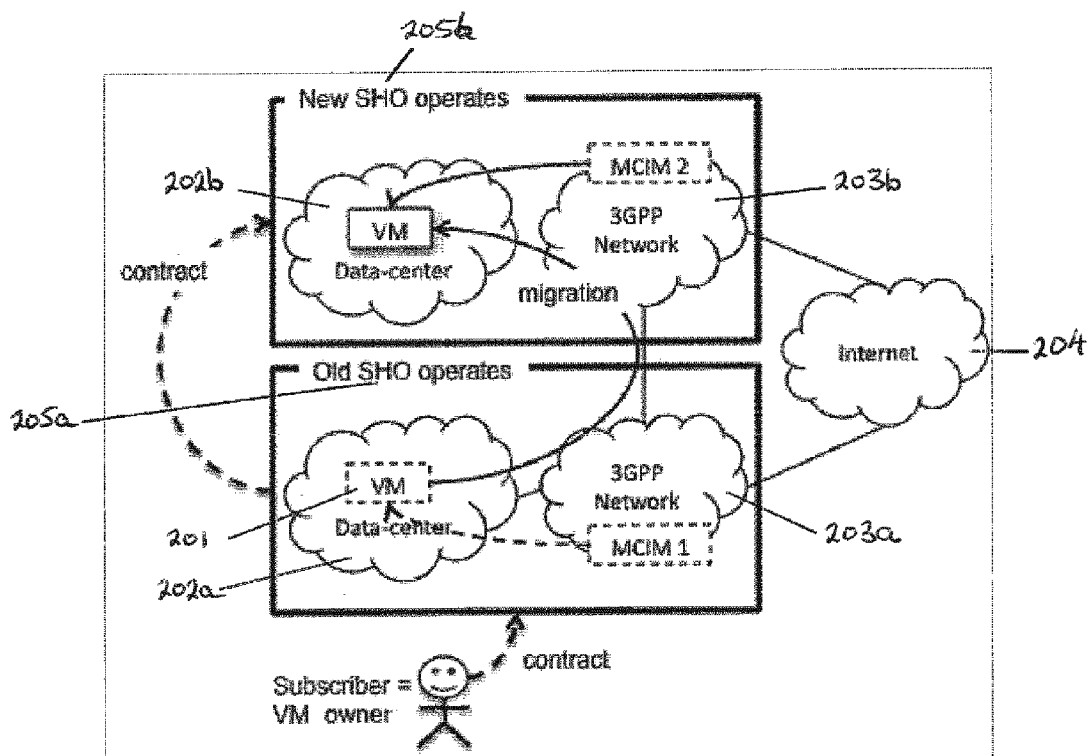
Figure 2: VM migrates from old Selected Home Operator's (SHO's) data-center to new SHO's data-center. In this IvD, VM is bound to a new MCIM at the new SHO.

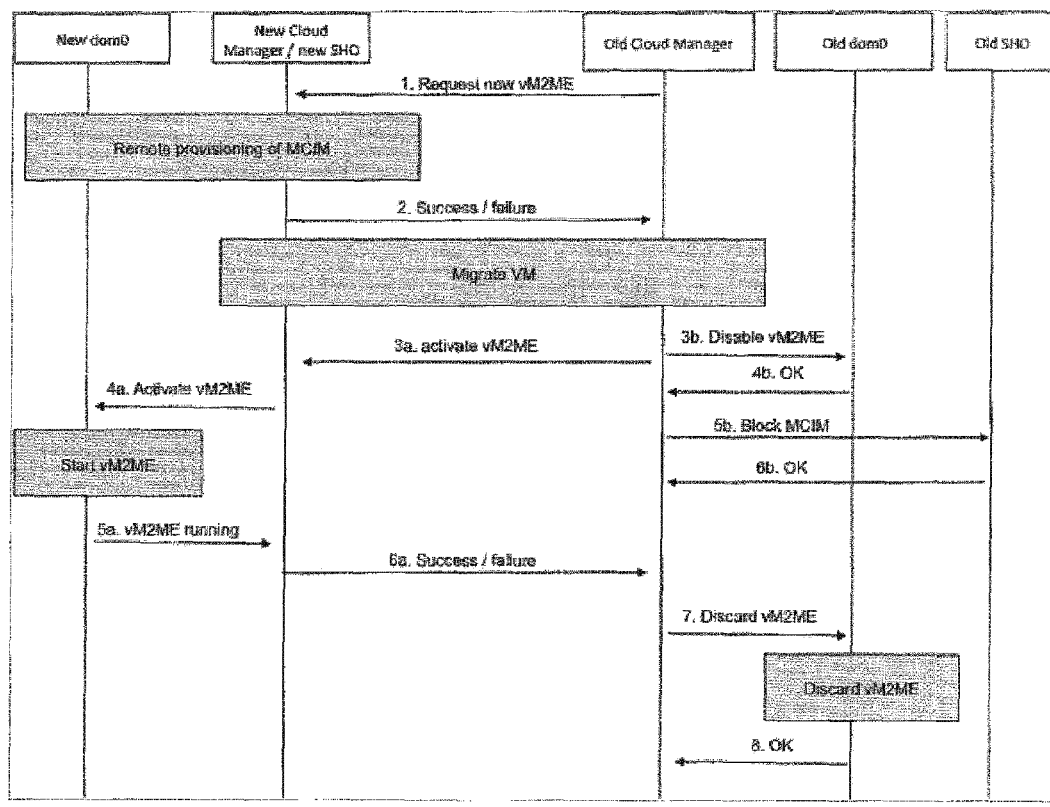
Figure 3: vM2ME migration.

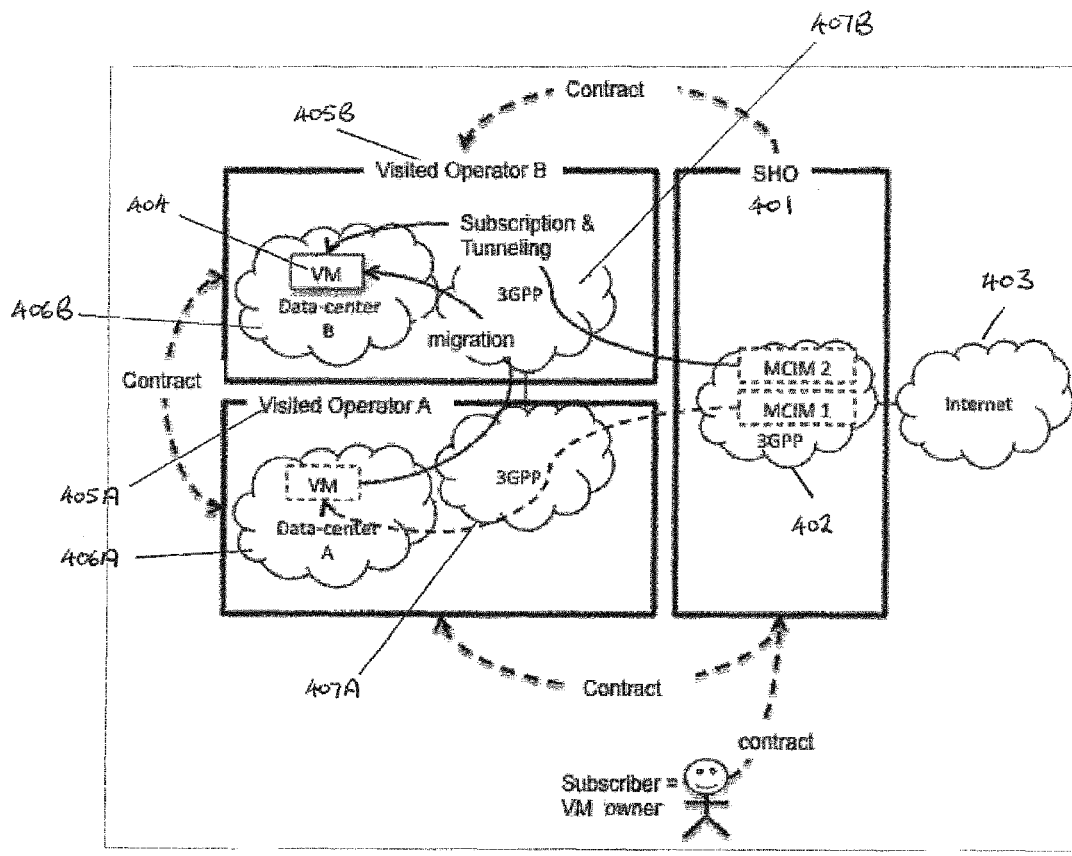
Figure 4: VM migrates ("roams") via 3GPP network from a visited operator's cloud to another visited operator's cloud. In this example, the VM is initially bound with MCIM-1 and after the migration with MCIM-2 (both from SHO). VM traffic is routed via SHO's 3GPP network.

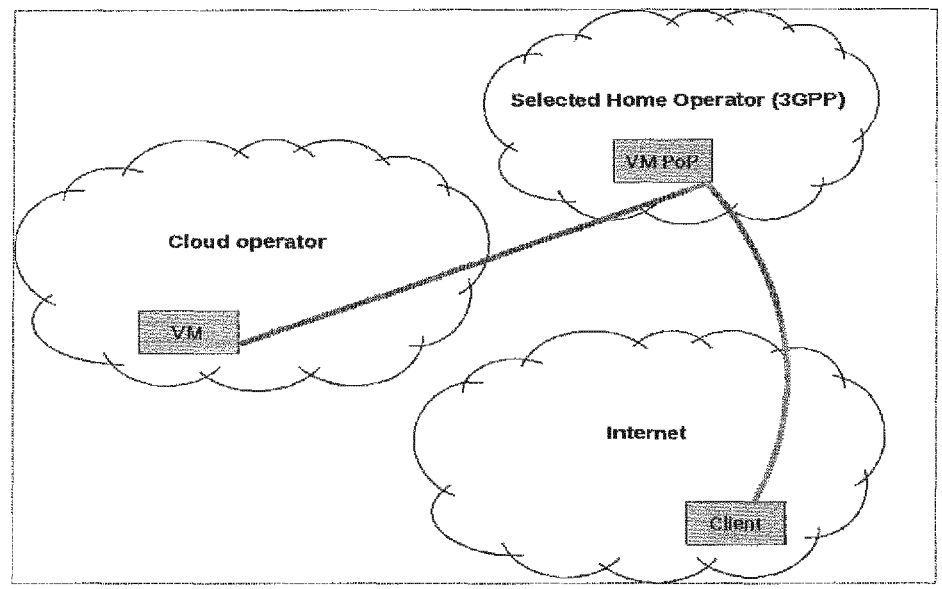
Figure 5: Triangular routing when always having the same PoP.
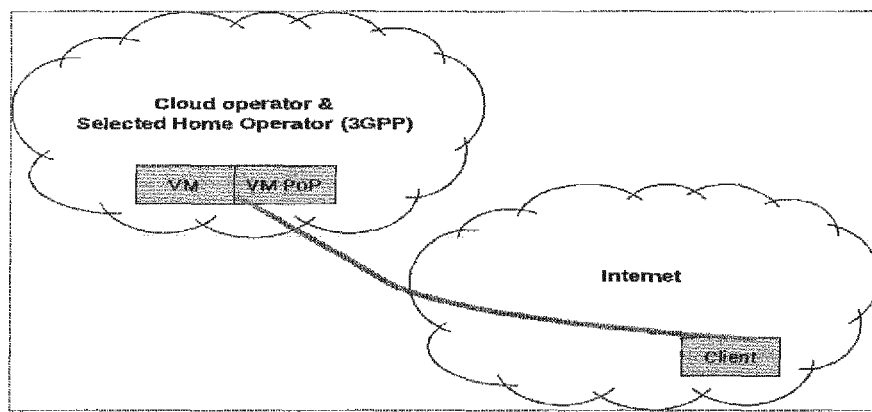
Figure 6: PoP changes when VM is migrated to a new SHO's cloud. This is what happens in alternative 1.

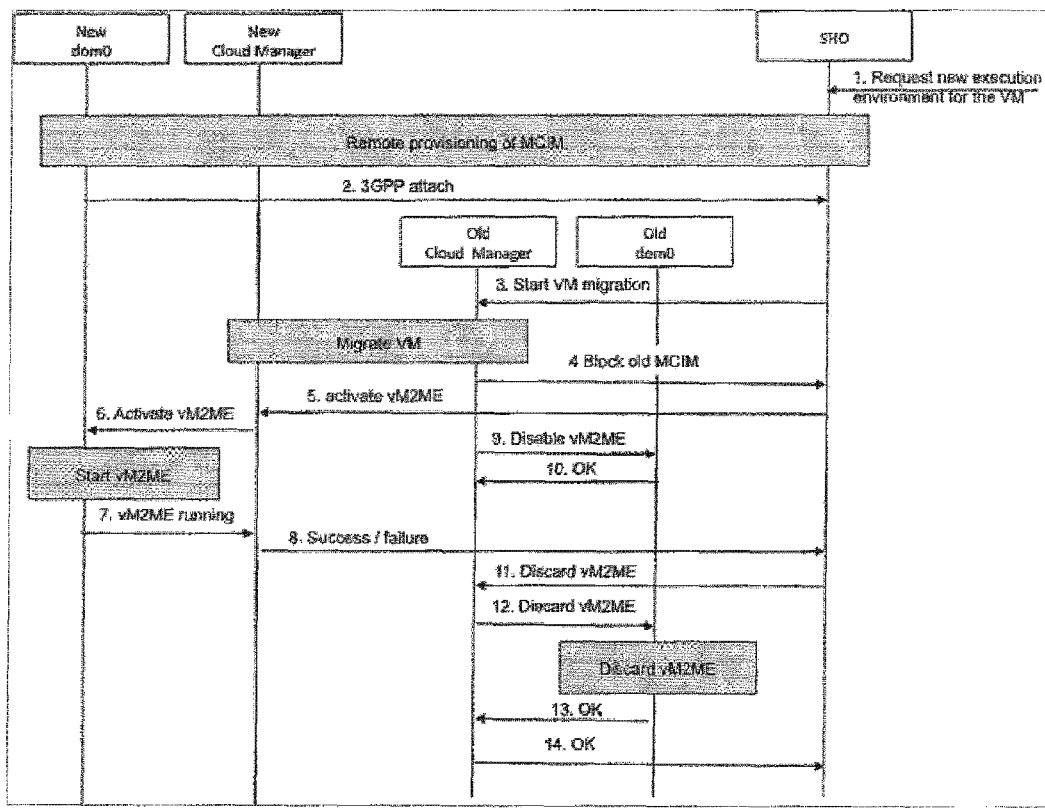
Figure 7: vM2ME migration.

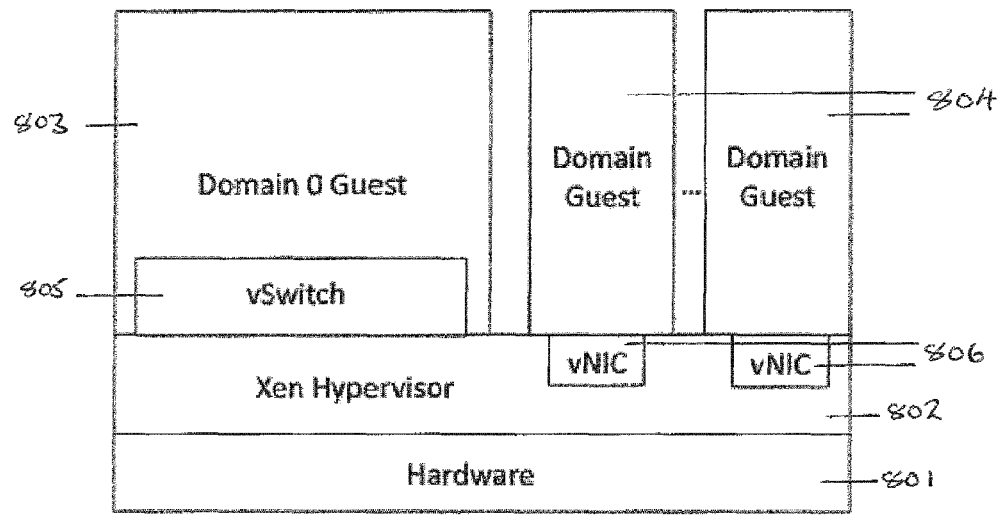
Figure 8: Xen hypervisor
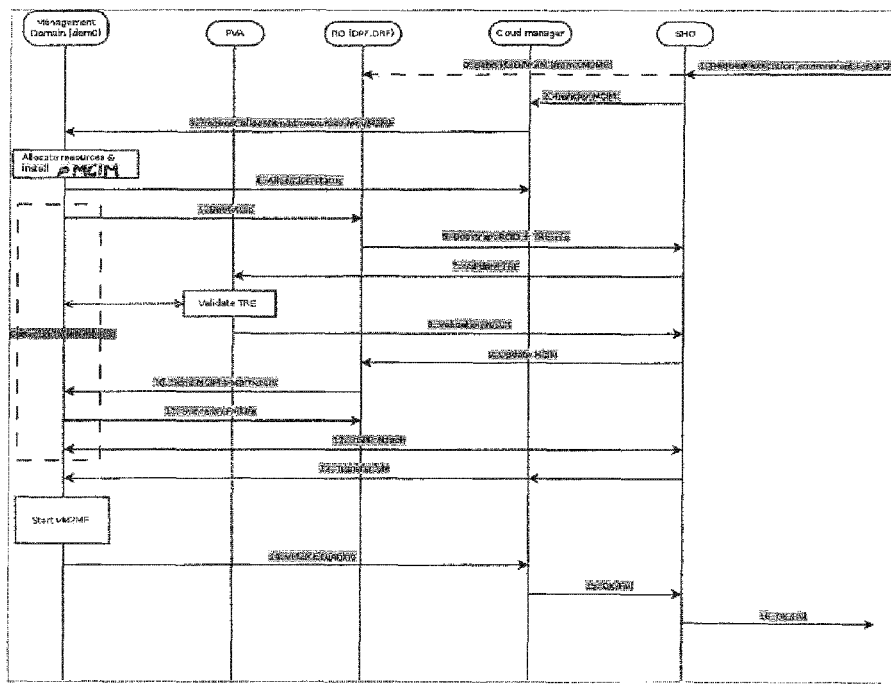
Figure 9 - Remote provisioning of vM2ME

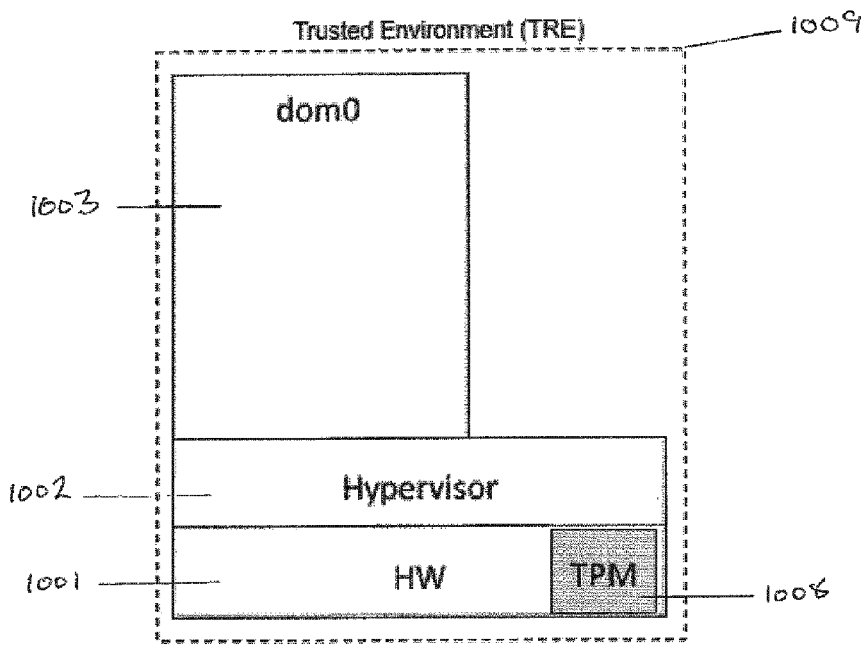
Figure 10 (a): Trusted Environment (TRE) adds TPM and secure boot-loader to virtualization platform.
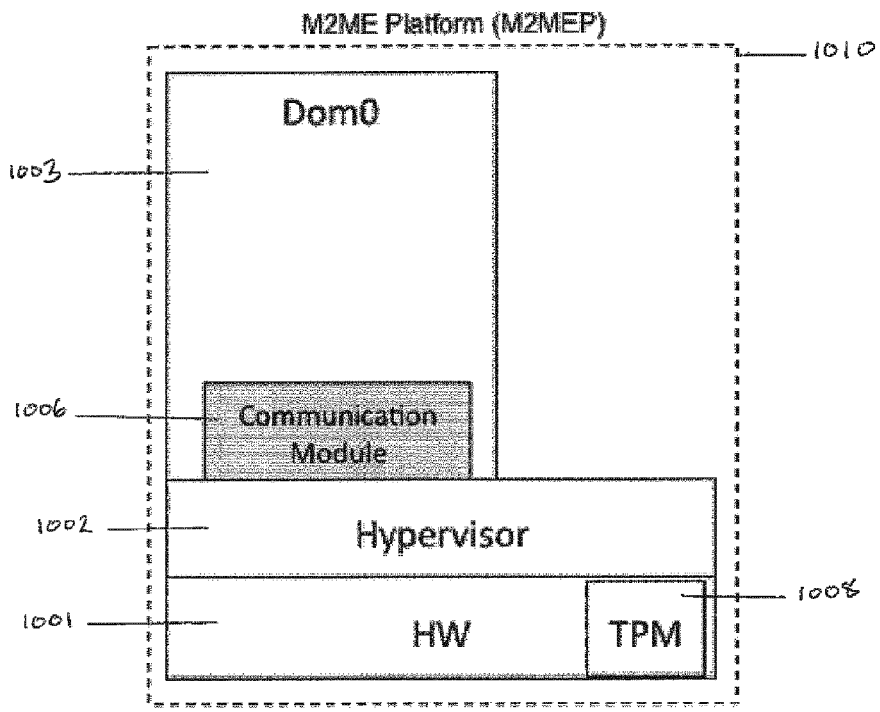
Figure 10(b): Machine-to-Machine Equipment Platform (M2MEP) provides communication module to TRE.

Request new vM2ME     1401

↓

Confirmation of new MCIM     1402

↓

Initiate migration     1403

↓

Disable first vM2ME     1404

↓

Activate new vM2ME     1405

↓

Release old vM2ME     1406

↓

Block/discard old MCIM     1407

Figure 14

Receive Request for new vM2ME — 1501

↓

Provision MCIM — 1502

↓

Report — 1503

↓

Receive instruction — 1504

↓

Activate vM2ME — 1505

↓

Report activation — 1506

Figure 15

Receive Request        1601

↓

Choose new cloud/host        1602

↓

Provision MCIM        1603

↓

Instruct VM Migration        1604

↓

Instruct activation        1605

↓

Block old MCIM        1606

↓

Release old vM2ME        1607

Figure 16

VIRTUAL MACHINE MIGRATION USING 3GPP MCIM

CROSS REFERENCE TO RELATED APPLICATION

This application is a 35 U.S.C. §371 national stage application of PCT International Application No. PCT/EP2011/074264, filed on 29 Dec. 2011, the disclosure of which is incorporated by reference herein in its entirety. The above-referenced PCT International Application was published in the English language as International Publication No. WO 2013/097903 A1 on 4 Jul. 2013.

TECHNICAL FIELD

The present invention relates to the execution of a "virtual machine" on a computing environment such as a "computing cloud", and in particular to the migration of a virtual machine from one computing environment to another computing environment or within a computing environment.

BACKGROUND

A "virtual machine" (VM) is a "completely isolated guest operating system installation within a normal host operating system". A VM is a software implementation of a machine (e.g. a computer) that executes programs like a physical machine. Today, virtual machines are implemented with software emulation, hardware virtualization or (most commonly) both together. "Hardware virtualization" (or platform virtualization) refers to the creation of a virtual machine that acts like a real computer with an operating system. Software executed on these virtual machines is separated from the underlying hardware resources.

A VM is typically run by an operator for a subscriber, who has a contract (subscription) with the operator. The operating system and software of the VM are determined by the subscriber, and the VM image (the VM "image" is, the pre-configured operating system binaries and metadata, (e.g., amount of RAM required) of the VM) is created by the subscriber and hence is untrustworthy from the operator's viewpoint.

There exist multiple solutions for providing virtualization platform for virtual machines. In these systems multiple virtual machines can be run on one physical machine. The abstraction of unlimited and dynamically allocated resources is called a cloud platform or just a cloud.

The operators are increasingly moving to becoming bit-pipe providers for over the top services and this is not a wanted position for them; they want to provide services. The installed identity management system is one thing that can be used for providing new services in the form of Identity and Access Management (IAM) and security for various services.

There are a number of problems with existing solutions. Some of the key resources of operators are the customer base and the identity management for the customers as well as the installed infrastructure. The business is based on standardized 3GPP mechanisms for charging, Quality of Service (QoS), security, roaming, interoperability, Service Level Agreements (SLAs) etc. Similar kinds of standards are pretty much missing from the cloud technologies. This makes it hard for operators to integrate their key resources with cloud platforms. In other words, the problem is how operators can benefit from their existing key resources with cloud computing. Therefore, it is also difficult to estimate how much operators can benefit from the cloud-computing paradigm and enter into new business fields.

VM Migration is used, e.g., for load-balancing reasons and elasticity during peak-hours. Typically, VM is transferred (migrated) to some other cloud that has a better resource situation. A VM may also be migrated between different hosts within a cloud.

In the case of a VM running on the Xen hypervisor, an administrator can "live migrate" a Xen VM between physical hosts across a LAN (local area network) without loss of availability. During this procedure, the LAN iteratively copies the memory of the VM to the destination without stopping its execution. The process requires a stoppage of around 60-300 ms to perform final synchronization before the VM begins executing at its final destination, providing an illusion of seamless migration. Similar technology can serve to suspend running of a VM to disk and switch to another VM, resuming the first VM at a later date—see http://en.wikipedia.org/wiki/Xen as downloaded on 14 Oct. 2011.

FIG. 18 shows the principal steps in a known "live migration" method. This is a "pre-copy" migration in which the VM memory is copied to the new location before the VM is migrated.

Initially at step (a) all memory pages of a VM executing on one hypervisor (hypervisor B), are copied to another hypervisor (hypervisor B). This step will take a finite time during which it is to be expected that some memory pages of the VM will have been updated. Pages that are updated during the copying of step (a) are known as "dirty pages" and, at step (b), all dirty pages—that is, all pages that were updated during the duration of step (a)—are copied to hypervisor B. More pages will become dirty during step (b), and the process of copying dirty pages to hypervisor B is therefore repeated as often as necessary at step (c), until the number of dirty pages becomes small.

Once the number of dirty pages has become sufficiently small, the VM is stopped at step (d), and the registers of the CPU on which hypervisor A is running, the device states and the current dirty memory pages are copied to hypervisor B. Finally, at step (e) is the VM is resumed on hypervisor B.

There are also known "postcopy" migration methods in which the VM memory is copied after the execution host has been changed.

SUMMARY

A first aspect of the invention provides a method of migrating a virtual machine. A first manager, managing a first computing environment, initiates migration of a virtual machine currently executing on a first vM2ME (virtual machine-to-machine equipment) in the first computing environment to a second computing environment. Once the VM has migrated, the first manager disables execution of the first vM2ME.

The second computing environment may be managed by a second manager different from the first manager. For example, the first computing environment may be a first computing cloud managed by a first manager, and the second computing environment may be a second, different computing cloud managed by a second manager—so that the VM is migrated from one computing cloud to another computing cloud. Alternatively, the first and second computing environments may both be in the same computing cloud (and so have the same manager as one another), so that the VM is migrated from one host in a computing cloud to another host in the same computing cloud.

Before initiating migration of a virtual machine: the first manager may send a request for establishment in the second computing environment of a vM2ME for execution of the VM.

The first manager may initiate migration of the virtual machine subsequent to receipt of confirmation that an MCIM has been provisioned for the virtual machine in a virtual management domain in the second computing environment.

After migration of the virtual machine to the second computing environment, the first manager may instruct the second manager to activate the vM2ME in the second computing environment.

The first manager may initiate releasing of virtual machine-to-machine equipment provisioned for the virtual machine in the first computing environment.

The first manager may instruct an operator associated with the first computing environment to block an MCIM associated with the virtual machine in the first computing environment. Alternatively, the first manager may instruct an operator associated with the first computing environment to discard an MCIM associated with the virtual machine in the first computing environment.

A second aspect of the invention provides a method of migrating a virtual machine. The method comprises receiving, at a manager managing a computing environment, a request to migrate to the computing environment a virtual machine that is currently executing on another computing environment. The manager initiates the provisioning of an MCIM for executing the virtual machine in the computing environment, and then instructs activation of the virtual machine in the computing environment.

The first aspect of the invention relates to a method carried out by the manager of an "old" computing environment, that is to say the manager of a computing environment in which the VM is currently executing and which the VM is being migrated away from. The second aspect, in contrast, relates to a complementary method carried out by the manager of a "new" computing environment, that is to say the manager of a computing environment to which the VM is being migrated.

The MCIM for executing the virtual machine in the computing environment may be provisioned in a virtual management domain in the computing environment.

The another computing environment may be managed by another manager different from the manager.

The manager may inform the another manager of the provisioning of the MCIM for the virtual machine.

The manager may instruct activation of the virtual machine in the computing environment consequent to receipt of an instruction from the another manager.

The manager may instruct the virtual management domain to activate the virtual machine.

The manager may inform the another manager of the activation of the virtual machine in the computing environment.

A third aspect of the invention provides a method of migrating a virtual machine. The method comprises deciding, at a home operator, on a new execution environment for a virtual machine that is associated with the home operator and that is currently being executed on a first computing environment. The home operator initiates provisioning of an MCIM (MCIM-2) for execution of a vM2ME for the virtual machine on a second computing environment different from the first computing environment. Upon receipt by the home operator of confirmation of provisioning of the MCIM, the home operator instructs a first manager managing the first computing environment to migrate the virtual machine to the second computing environment.

The first and second aspects of the invention relates to method carried out by the manager of an "old" computing environment and the manager of a "new" computing environment. The third aspect relates to a complementary method carried out by an operator who is not the manager of either the "old" or "new" computing environment.

At the time of receipt of the request for the new execution environment for the virtual machine, the virtual machine may be associated with another MCIM (MCIM-1) provided by the home operator for execution of the virtual machine in the first computing environment.

After the virtual machine has been migrated to the second computing environment, the home operator may block the another MCIM (MCIM-1) provided by the home operator for execution of the virtual machine in the first computing environment.

The second computing environment may be managed by a second manager different from the first manager.

The home operator may instruct the second manager to activate the virtual machine in the second computing environment.

After activation of the virtual machine in the second computing environment, the home operator may instruct the first manager to discard virtual machine-to-machine equipment provisioned for the virtual machine in the first computing environment.

A fourth aspect of the invention provides a telecommunications network entity configured to migrate a virtual machine. The network entity comprises a processor and memory storing programming instructions that, when executed by the processor, cause the network entity to initiate migration of a virtual machine currently executing on a first computing, which is managed by the network entity, to a second computing environment. The instructions further cause the network entity to and disable execution of the virtual machine on the first computing environment.

The instructions may further cause the network entity to, before initiating migration of a virtual machine send a request for establishment in the second computing environment of a vM2ME for execution of the VM.

The instructions may further cause the network entity to initiate migration of the virtual machine subsequent to receipt of confirmation that an MCIM has been provisioned for the virtual machine in a virtual management domain in the second computing environment.

The instructions may further cause the network entity to, subsequent to migration of the virtual machine to the second computing environment, instruct the second manager to activate the vM2ME in the second computing environment.

The instructions may further cause the network entity to initiate releasing of virtual machine-to-machine equipment provisioned for the virtual machine in the first computing environment.

The instructions may further cause the network entity to instruct an operator associated with the first computing environment to block an MCIM associated with the virtual machine in the first computing environment.

The instructions may further cause the network entity to instruct an operator associated with the first computing environment to discard an MCIM associated with the virtual machine in the first computing environment.

A fifth aspect of the present invention provides a telecommunications network entity configured to migrate a virtual machine. The network entity comprises a processor and memory storing programming instructions that, when executed by the processor, cause the network entity to receive a request to migrate, to a computing environment managed by the network entity, a virtual machine currently executing on another computing environment. The instructions further cause the network entity to initiate the provisioning of an MCIM for executing the virtual machine in a computing environment managed by the network entity, and to instruct activation of the virtual machine in the computing environment managed by the network entity.

The instructions may further cause the network entity to initiate provisioning of the MCIM for executing the virtual machine in the cloud in a virtual management domain in the computing environment.

The instructions may further cause the network entity to inform the another manager of the provisioning of the MCIM for the virtual machine.

The instructions may further cause the network entity to instruct activation of the virtual machine in the computing environment consequent to receipt of an instruction from the another manager.

The instructions may further cause the network entity to instruct the virtual management domain to activate the virtual machine.

The another computing environment may be managed by another manager different from the network entity, and the instructions may further cause the network entity to inform the another manager of the activation of the virtual machine in the cloud.

A sixth aspect of the present invention provides a telecommunications network entity configured to manage a virtual machine. The network entity comprises a processor and memory storing programming instructions that, when executed by the processor, cause the network entity to decide on a new execution environment for a virtual machine currently being executed on a first computing environment, the virtual machine being associated with the network entity. The instructions may further cause the network entity to initiate provisioning of an MCIM for a vM2ME for execution of the virtual machine on a second computing environment different from the first computing environment, and to instruct, upon receipt by the network entity of confirmation of provisioning of the MCIM, a first manager managing the first computing environment to migrate the virtual machine to the second computing environment.

At the time of receipt of the request for the new execution environment for the virtual machine, the virtual machine may be associated with another MCIM (MCIM-1) provided by the home operator, and the instructions may further cause the network entity to block the another MCIM (MCIM-1) after the virtual machine has been migrated to the second computing environment.

The second computing environment may be managed by a second manager different from the first manager, and the instructions may further cause the network entity to instruct the second manager to activate the virtual machine in the second computing environment.

The instructions may further cause the network entity to, after activation of the virtual machine in the second computing environment, instruct the first manager to discard virtual machine-to-machine equipment provisioned for the virtual machine in the first computing environment.

A seventh aspect of the present invention provides a computer-readable medium containing instructions that, when executed by a processor, cause the processor to carry out a method of the first, second or third aspect.

An eighth aspect of the present invention provides a computer program that, when executed by a processor, causes the processor to carry out a method of the first, second or third aspect.

In any aspect or embodiment of the invention, the first computing environment and/or second computing environment may be a virtualised computing environment, although the invention is not limited to this.

One concept of this application is to describe how VMs that are utilizing MCIM/3GPP identities can be migrated between clouds (or between different virtualised computing environments), or between hosts within the same cloud. This allows new kind of roaming service for VMs. It is possible to migrate from one cloud system to another depending on (but not limited to) physical location requirements. For example, services to disaster-stricken areas may be migrated to a closer cloud system in order to minimize costs, maximize bandwidth (which usually is very scarce resource in disaster areas).

The solution is based on utilizing a downloadable subscriber module, for example such as the MCIM as defined in 3GPP TR 33.812 (version 9.2.0 dated 22 Jun. 2011) for providing VMs with 3GPP identities and credentials which can be used for identifying the VM and for providing security and QoS to the VM. The invention also provides a modification to the migration defined in 3GPP TR 33.812 to allow support of VM migration.

For convenience of description, the downloadable subscriber module used in the description of the invention will be referred to as an "MCIM". However, it is to be understood that the term "MCIM" as used in this application is intended to denote any kind of downloadable subscriber module, and that the invention is not limited to the specific downloadable subscriber module defined in 3GPP TR 33.812.

BRIEF DESCRIPTION OF THE FIGURES

Preferred embodiments of the present invention will be described by way of example with reference to the accompanying figures in which:

FIG. 1 is a schematic illustration of VM migration;

FIG. 2 is a schematic illustration of an embodiment of VM migration from one Selected Home Operator (SHO) to another SHO;

FIG. 3 is a signaling diagram for the migration of FIG. 2;

FIG. 4 is a schematic illustration of an embodiment of VM migration from one visited operator's cloud to another visited operators cloud;

FIG. 5 illustrates routing for a constant Point of Presence;

FIG. 6 illustrates a change in a Point of Presence;

FIG. 7 is a signaling diagram for the migration of FIG. 4;

FIG. 8 is a schematic block diagram showing a Xen hypervisor;

FIG. 9 is a signalling diagram for one process of re-provisioning a vM2ME;

FIG. 14 is a schematic block flow diagram showing a method according to one embodiment of the present invention;

FIG. 15 is a schematic block flow diagram showing a method according to another embodiment of the present invention;

FIG. 16 is a schematic block flow diagram showing a method according to another embodiment of the present invention;

DETAILED DESCRIPTION

Figure 10:
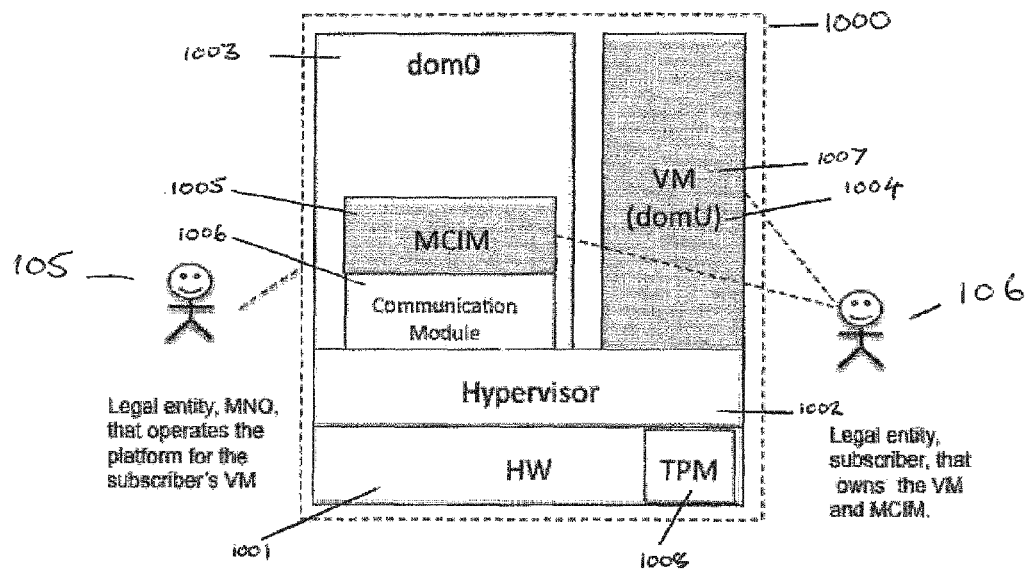
FIG. 10(a) is a schematic block diagram of a trusted environment.
FIG. 10(b) is a schematic block diagram of an M2MEP.
FIG. 10(c) is a schematic block diagram of one scenario of an MNO offering M2MEP for a subscriber's VM.

Firstly, various terms used in the description of the present invention will be defined and/or explained.

A "Subscriber Identity Module" (SIM) is used to identify a subscriber using a mobile device, and to authenticate the subscriber to a mobile network operator so that the network operator can authorise the subscriber to use the mobile device currently associated with the SIM to transmit and receive calls/data using the mobile device. (The SIM identifies a subscriber, that is a person or organisation that has a subscription contract with an operator, and the user of a mobile device associated with the SIM may be different from the subscriber—for simplicity however it will be assumed that the user of the mobile device is also the subscriber.) The SIM contains, in general, identification information identifying the subscriber and also contains information for establishing and securing communication between a device associated with a SIM and a network (such as encryption information that enables the SIM to encrypt speech or data being sent from the mobile device, and to decrypt received speech or data).

Currently the personal identity information for a mobile device is usually held on a SIM (Subscriber Identity Module) card in the mobile device, or on a USIM (Universal Subscriber Identity Module) card in the mobile device. A SIM card, USIM card or UICC is a microprocessor chip with persistent storage. In 3G networks a SIM or USIM may be an application running on a Universal Integrated Circuit Card (UICC).

3GPP (3rd Generation Partnership Project) credentials stored on Universal Integrated Circuit Cards UICCs (SIM cards, or an SIM application running on an UICC) are used for identifying 3GPP devices and for establishing and securing communication between the device and the 3GPP network. The installed infrastructure for 3GPP subscriber management and the standardized technology used for it are key resources of the 3GPP operators.

An M2M (Machine-to-Machine) device is a device that can communicate with other devices, either via a wired system or a wireless system. Examples of M2M devices include electricity or gas meters, traffic cameras and vending machines. An M2M device has a SIM for identifying the device and for establishing and securing communications to/from the device.

An M2M device preferably contains a Trusted Environment or TRE and a Communications Module CM. The CM is a communication end-point that interacts with an operator's 3GPP network, and set up necessary tunneling for the VM. Traffic between the 3GPP network and a VM is authenticated by an MCIM (see below). The combination of a virtualisation platform, a CM and a TRE is referred to as M2MEP (Machine-to-Machine Equipment Platform).

The Trusted Environment (TRE) provides trusted run-time environment for hypervisor, management domain (e.g., Dom0 for the Xen hypervisor) using a Trusted Platform Module (TPM) and a secure boot-loader. The TRE can be validated at any time by an external agency that is authorized to do so. The external agency uses, e.g., TPM-based remote attestation to verify the secure boot-process for the hypervisor and the management domain. TRE provides hardware and software protection and separation for the provisioning, storage, execution and management.

In principle the SIM of an M2ME may be provided as a conventional SIM card. However, since large numbers of M2ME may be provided at widely dispersed locations it can be inconvenient to have to visit each M2ME, for example if there is a change of network operator. There have therefore been proposals for remote downloading on a SIM into an M2ME. For example, 3GPP TR 33.812, "Feasibility study on the security aspects of remote provisioning and change of subscription for Machine to Machine (M2M) equipment", presents the 3GPP results on the study of downloadable USIM, also known as MCIM (for Machine Communication Identity Module). The solution, which is targeted for Machine-to-Machine (M2M) communication scenarios, basically replaces the UICC card with a software based MCIM (or USIM) that can be downloaded into the device (for example into an M2ME). The MCIM performs the functions that would be performed by a conventional SIM card such as, among others, authenticating the subscriber and establishing and securing communications to/from the device.

Just as a physical device may be provided with a SIM, a virtual machine also may be provided with a SIM, in particular with an MCIM. The combination of an MCIM and one or more VMs is referred to a "vM2ME" ("virtual machine-to-machine equipment"). The MCIM is associated with a virtual interface in the management domain. Furthermore, the virtual interface is associated with the VM. The associations can be expressed, e.g., with certificates signed by the management domain administrator and/or by the MNO. The MCIM identifies and authenticates the VM and/or the subscriber to a network operator and enables communication between the VM and the network. For the purposes of this application, an MCIM indicates the collection of M2M security data and functions for an M2ME for accessing a 3GPP network.

An M2MEP is required for running a vM2ME, and the MCIM and the related VM(s) must be deployed together on the M2MEP.

The following terms will, among others, be used in this application:

MCIM:—MCIM is a novel concept studied in 3GPP. As explained above, an MCIM is a subscriber identity module that authenticates a device, such as an M2ME, and protects establishing and securing communications to/from the device. A MCIM may be remotely downloaded to a device, compared to a conventional SIM card which must be physically inserted into the device. The goal is to provide a mechanism for devices to be able to download their network credentials from device's real home operator, with whom the owner of the device has established a service agreement. The commonly agreed operating procedure currently goes as follows:

1 The owner of the device enters a service agreement with a mobile network operator, and registers his/her device.

2 The Discovery and Registration Function (DRF) handling the mobile device (i.e. providing preliminary credentials to the device) is informed of the Selected Home Operator (SHO) of the device and stores this mapping.

3 The mobile device is powered on, and it will scan for available mobile networks to try to connect to a 3GPP Visited Network Operator (VNO)/Initial Connectivity Function (ICF). The preliminary credentials stored in the M2ME (Machine-to-Machine Equipment) are used for connecting to the network and they point to the current home network of the device, to the DRF.

4 The DRF will inform the M2ME about the SHO registered to it and redirects the device to the SHO/MCIM Download and Provisioning Function (DPF) operated by the SHO.

5 Next, the mobile device will connect to the SHO/DRF, and download the proper credentials that enable the device to start using the SHO subscription as per the service agreement between the owner of the device and the mobile network operator.

The current scope for MCIM is for sensor like devices that the owner usually does not have physical access to and needs to manage remotely.

As noted above, the term "MCIM" as used herein is intended to include any downloadable subscriber identity module.

Cloud Computing (CC) provides an abstraction of unlimited amount of networking, computing and storage resources for clients. The abstraction is achieved by virtualization of the infrastructure, platform and software in data centers. At the infrastructure level, the virtualization is implemented with so-called hypervisor. Cloud computing provides computation, software, data access, and storage services that do not require a subscriber to have knowledge of the physical location and configuration of the system that delivers the services. Cloud computing providers deliver applications via the internet, which are accessed from web browsers and desktop and mobile apps, while the business software and data are stored on servers at a remote location. Cloud Computing requires federated identity management, both for the users connecting to the virtual machines (VMs) but likewise for the VMs themselves.

In these systems multiple virtual machines can be run on one physical machine. The abstraction of unlimited and dynamically allocated resources is called a cloud platform or just a cloud. The virtual machines are run in isolated run-time environments (in Xen terminology, domUs) while the control mechanism of the virtualization platform runs in a specific run-time environment (called dom0).

Where the term "cloud" is used in this application, this term may denote any computing environment having the characteristics defined by the National Institute of Standards and Technology for a computing cloud, namely the following:
Elastic;
On-demand;
Broad network access (i.e. a user should be able to access the cloud through any technology (cellular, fixed broadband, etc);
Resource pooling;
Ability to measure services ("the cloud" should be able to measure the consumption of resources, such as disk space, CPU/cycles, etc, to make charging possible).

It should be noted that "virtualization" is NOT required in a cloud.

At the infrastructure level, the virtualization is implemented by means of a Virtual Machine Manager (VMM), otherwise referred to as a hypervisor. (The term "hypervisor" will be used in this application.), A hypervisor is one of many hardware virtualization techniques that allow multiple operating systems, termed guests, to run concurrently on a host computer. Xen is a well-known and widely used hypervisor. A Xen system has a conceptual layered structure, as depicted schematically in FIG. 8, with the Xen hypervisor 802 as the lowest and most privileged layer residing on the hardware 801. Above this layer come one or more guest operating systems 803, 804, which the hypervisor 802 schedules across the physical CPUs. The first guest operating system 803, called in Xen terminology "domain 0" (dom0), boots automatically when the hypervisor 802 boots and receives special management privileges and direct access to all physical hardware by default. The system administrator can log into dom0 in order to manage any further guest operating systems 804, called "domain U" (domU) in Xen terminology." FIG. 8 also shows the domain 0 guest operating system 803 and two other guest operating systems 804, but the number of other guest operating systems 804 is not limited to 2).

A VM may be run in a DomU domain (as shown in FIG. 10(c)). The hypervisor hides the physical hardware from a VM running on a domU domain, and presents a set of emulated virtual devices to the VM.

A virtual Switch (vSwitch) 805 is implemented in software and integrated with the hypervisor 802. In addition, the hypervisor implements virtual Network Interface Cards (vNICs) 806 with each domU guest operating system 804. (An "NIC" or "Network Interface Card" is a computer hardware component that connects a computer to a computer network; today most computers have a network interface built in and this is referred to as a "pNIC" or "Physical Network Interface Card". A "vNIC" or "Virtual Network Interface Card" emulates a physical Network Interface Card towards a virtual machine, and is run on the hypervisor.)

It should be noted that the terms "dom0" and "domU" are specific to the Xen hypervisor. In general however, a hypervisor will allow multiple guest operating systems to run, with one guest operating system booting automatically when the hypervisor boots and receiving special management privileges. The guest operating system that boots automatically when the hypervisor boots may be referred to as a "virtual management domain".

Open vSwitch can operate as a soft switch running within the hypervisor, and has also been implemented in hardware (i.e. in switches). the control stack for switching silicon. It has been ported to multiple virtualization platforms and switching chipsets.

Cloud OS:—A "Cloud Operating System" or "Cloud OS" manages hypervisors, domain guests (VMs), (virtual) switches and other resources in the data-centers.

A method of the present invention may involve some or all of the following parties:

A VM owner who "owns" one or more VMs, in that the VM owner has a subscription (ie, a contract) with an operator to run the VM(s). (The VM owner does not own the computing environment on which his/her VM(s) are run). The VM owner may also be referred to as a "subscriber", since they have a subscription with the operator.

For convenience the detailed description of the invention will assume that there is a single VM, but this is not intended to exclude application of the invention to migration of two or more VMs.

A "home operator"—who is the operator whom the VM owner has contracted to run the owner's VM.

Although the "home operator" has the contract with the VM owner, it is not necessary for the home operator to run the owner's VM. The home operator may make a contract with another operator, known as a "visited operator", under which the visited operator runs the VM. In the embodiment of FIG. 2 the VM may be run either by the home operator or by a visited operator, but in the embodiment of FIG. 7 the VM is always run by a visited operator.

In principle, an operator (whether a home operator or a visited operator) may themselves operate the computing environment on which the owner's VM is run. Alternatively, the computing environment on which the owner's VM is run may be operated and managed by a further entity, referred to as a "cloud manager", under a contract from the operator.

Customers of the VM owner may access the VM, eg under payment to the VM owner. However, these customers play no part in the migration processes described in this application.

In this application, a "subscription" is an MCIM-based association between a subscriber and an operator (where, as noted, "MCIM" may generally denote a downloadable subscriber identity module).

In this application, when describing a migration the terms "old" and "new" will be used to denote before and after the migration respectively. Thus, for example, an "old" cloud manager is the manager of the cloud on which the owner's VM is executing before the migration, and a "new" cloud manager is the manager of the cloud on which the owner's VM is executing after the migration.

The invention will be described with reference to migration of a VM from one computing cloud to another, or within one computing cloud. The description of the invention with reference to migration between or within computing clouds is however for example only, and the invention is not limited to use within computing clouds but may be applied in other computing environments such as, for example in application level process migration or in distributed programming where different application modules can be executed on arbitrary processors/locations.

The invention will be described with reference to a Xen hypervisor, and terms such as "dom0" and "domU" will be used to refer to a management domain and a run time environment respectively. This is for convenience of description only, and the invention may be implemented on other hypervisors.

Co-pending application PCT/EP 2011/ . . . (Marks & Clerk Reference PX210336WO), hereinafter "P34573", the contents of which are hereby incorporated by reference, describes the overall operation of a system with MCIM managed VMs.

The solution presented in P34573 binds virtual machines in private (telco) cloud with 3GPP mobile network subscriptions and allows inter-operation between existing cloud operating systems and 3GPP systems. Co-pending application PCT/EP 2011/ . . . (Marks & Clerk Reference PX210379WO), hereinafter "P34691", the contents of which are also incorporated by reference, describes alternative ways of performing initial provisioning of MCIMs in the system presented in P34573 and the migration solution presented in this document also utilizes these provisioning solutions.

The present invention addresses how to implement VM migration between one computing environment and another computing environment, or between different hosts in the same computing environment, to support the system described in P34573. As noted above, the computing environment(s) may be (a) virtualised computing environment(s), although the invention is not limited to this. The invention will be described with particular reference to VM migration between clouds, or between hosts in the same cloud but this is by way of example only and is not an indication that the invention is limited to VM migration between clouds, or between hosts in the same cloud. In this present invention, we disclose a migration mechanism for migrating a VM together with/using 3GPP credentials/MCIM concepts (i.e. virtual Machine to Machine equipment or "vM2ME"), in a way suitable for mobile network operators' telecommunications cloud.

The basic concept in this application is to describe how VMs that are utilizing MCIM/3GPP identities can be migrated between clouds or between hosts within the same cloud. It is possible to migrate from one cloud system to another depending on (but not limited to) physical location requirements. For example, services to disaster-stricken areas may be migrated to a closer cloud system in order to minimize costs, maximize bandwidth (which usually is very scarce resource in disaster areas).

The solution consists of utilizing the MCIM as defined in 3GPP TR 33.812 for providing VMs 3GPP identities and credentials which can be used for identifying the VM and for providing security and QoS to the VM. The migration as defined in 3GPP TR 33.812 can be modified for also supporting VM migration.

FIG. 1 is a schematic illustration showing one or more VMs 101 executing on a Cloud Operating System 102 (for example in a data centre). The Cloud OS 102 is connected to the Internet 104 by a 3GPP network 103. FIG. 1 shows an exemplary situation in which a Mobile Network Operator (MNO) 105 is both the operator of the 3GPP network 103 and of the data center or cloud OS 102. A subscriber 106 is the owner of VMs 101 (here two VMs are shown, but there could be any number), that provide services to customers (not shown) who access the VMs 101 over the Internet 104. (A customer may for example be a customer of the subscriber, the subscriber themselves if the subscriber is a natural person, an employee of the subscriber or a person or organisation associated with the subscriber if the subscriber is a company, etc.) The VM owner/subscriber 106 has a subscription with the MNO 105. Each VM 101 is associated at least with one MCIM, and the combination of a VM 101 and its associated MCIM forms a vM2ME.

FIGS. 10(a)-10(c) illustrate the conceptual stages in the building of a vM2ME, using the layered concept introduced in FIG. 8. Note that some elements shown in FIG. 8, such as the vSwitch 805 and the vNICs 806 have been omitted from FIGS. 10(a)-10(c) for clarity, but would actually be present. As shown in FIG. 10(a), a trusted environment (TRE) 1009 is defined around the dom0 1003 and the hypervisor 1002 residing on hardware 1001, by installation of a trusted platform module (TPM) 1008 together with a secure boot-loader (not shown). (A secure boot loader performs a sequence of actions during the boot-up, to ensure a secure initial state.) Trusted environments (TREs) for Machine-to-Machine Equipment (M2ME) are discussed in 3GPP TR 33.812 "Feasibility study on the security aspects of remote provisioning and change of subscription for Machine to Machine (M2M) equipment", hereinafter just "3GPP TR 33.812".

The TRE 1009 is validated by an external agency. TRE verification may be done, for example, using a remote attestation mechanism provided by a Platform Validation Authority (PVA)—the PVA may verify that the cloud OS is running the MCIM on a TRE, as discussed in 3GPP TR 33.812, which also includes a requirement for runtime environment isolation that is implemented by the hypervisor. The TPM can also be used for providing a validation of the state of the vM2ME to the PVA.

FIG. 10(b) illustrates an M2MEP 1010, which includes all the elements of the TRE 1009 of FIG. 10(a) together with a communication module (CM) 1006 installed for execution in the dom0 1003.

FIG. 10(c) illustrates an example of a vM2ME 1000, which includes all the elements of the M2MEP 1010 of FIG. 10(b) together with an MCIM 1005 installed for execution with the CM (communication module) 1006 in the dom0 guest operating system 1003, and an associated VM 1007 executing in a domU guest operating system 1004. FIG. 10(c) also shows how the conceptual structure of the vM2ME 1000 relates to the parties involved in subscription of FIG. 1—i.e. the MNO (corresponding to the MNO 105 of FIG. 1) and the entity owning the VM (corresponding to the subscriber 106 of FIG.

1). As shown the MNO operates the virtualization platform (vM2ME 1000) while the subscriber is the owner of the MCIM 1005 and associated VM 1007.

As described, a TPM 1008 is provided in the hardware 1001. In FIG. 10(*c*), the MCIM is part of a vM2ME, which itself is built on the TRE 1009 of FIG. 10(*a*). The TPM 1008 is used for performing a secure boot of the hypervisor 1002 and guest management domain (dom0) 1003, as well as for storing sensitive information such as MCIM(s).

Note that FIG. 10(*c*) shows only one VM 1004, whereas there may be more than one VM in the vM2ME owned by the subscriber and associated with the MCIM 1005 and CM 1006.

In the following two alternatives for migration of an MCIM+VM are described. The first solution utilizes an MCIM from the currently visited operator while the 2$^{nd}$ alternative always utilizes an MCIM from the home operator, i.e. the VM always has an MCIM from the same operator.

Initially, a background overview of a VM managed by MCIM will be given.

For each VM an MCIM is downloaded (although more than one VM may be associated with an MCIM) and associated with a CM (communications module). The storing, handling and running of these can vary; 4 different scenarios are presented in P34573. To summarise briefly, the 4 scenarios presented in P34573 are:
1) MCIM and CM are located in dom0 (FIG. 10(*c*));
2) MCIM and CM are located in an operator's virtual machine that is connected to the subscriber's virtual machine (FIG. 11);
3): MCIM and CM are located in the same virtual machine where the subscriber's service is running (FIG. 12);
4): MCIM and CM are located on physical interface network card (FIG. 13).

FIG. 10(*c*) has been described above.

Figure 11:
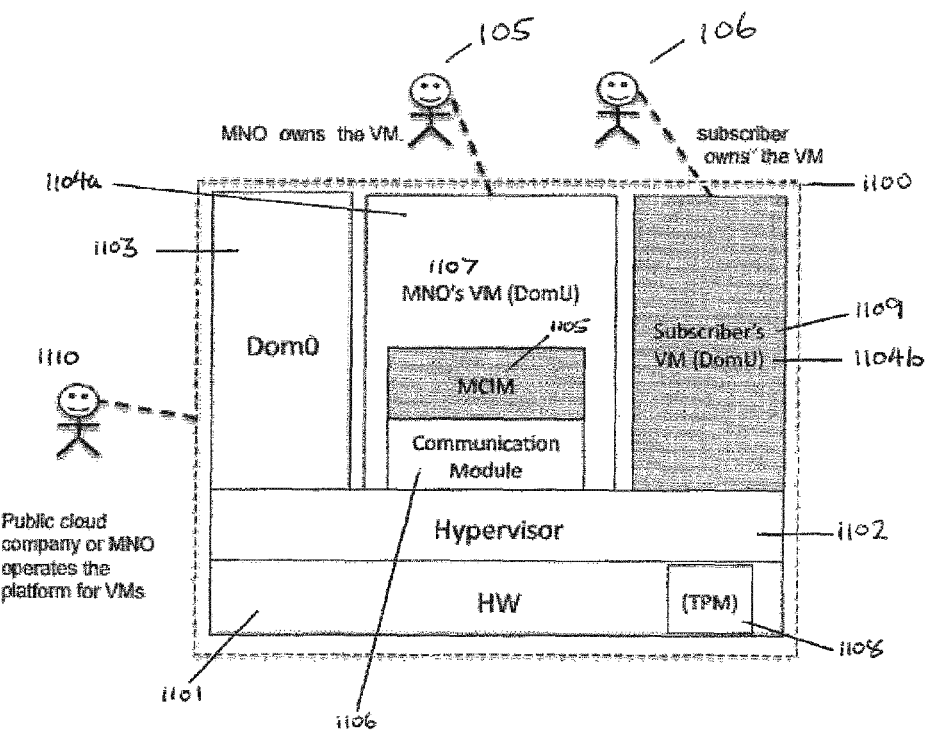
FIG. 11 is a schematic block diagram of another scenario of an MNO offering m2MEP for a subscriber's VM.

FIG. 11 illustrates a vM2ME 1100 using the layered concept as previously described. In this case a VMM or hypervisor 1102 resides on hardware 1101, and there is a TRE which is optionally based on a TPM 1108. The hypervisor 1102 supports a Dom0 1103 and DomU domains 1104*a*,1104*b* of the virtualization platform. FIG. 11 shows an MCIM 1105 installed for execution with the CM 1106 in the MNO-VM 1107 in a domU domain 1104*a*, and also shows an associated Subscriber's VM 1109 in another domU domain 1104*b*. The vM2ME 1100 runs the subscriber's (untrustworthy) VM 1109.

FIG. 11 also illustrates schematically how the conceptual structure of the vM2ME 1100 of FIG. 11 relates to the parties involved. In this embodiment a Cloud OS administrator 1110 operates the virtualization platform (vM2ME 1100) and the MNO owns the MNO-VM 1107 that runs in the cloud, while the subscriber is the owner of the MCIM 1105 and associated VM 1109. The Cloud OS administrator 1110 may be a third party public cloud provider company, or could be the MNO who operates the platform under an arrangement with the third party cloud provider.

Note that in the scenario of FIG. 11, the Subscriber creates its own VM image, which is untrusted from the viewpoint of the MNO, and thus cannot contain the subscriber's MCIM 1105. Therefore, the MCIM 1105 must be stored/executed in a separate VM 1107 that is trusted by the MNO. To bind the subscriber's VM 1109 with the trusted MNO-VM 1107, the MNO must deploy both VMs. This allows a valid association between the VMs to be created. In other words, the MNO requests resources for both the VMs from a public cloud on behalf of the subscriber.

Figure 12:
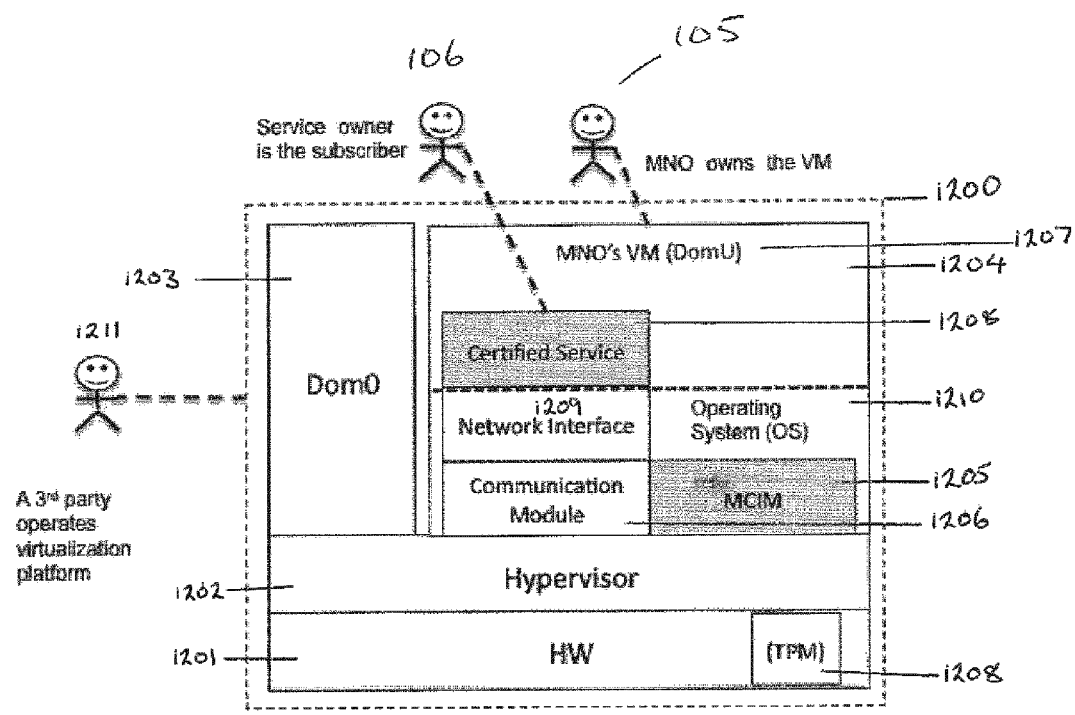
FIG. 12 is a schematic block diagram of another scenario of an MNO offering m2MEP for a subscriber's VM.
Figure 13:
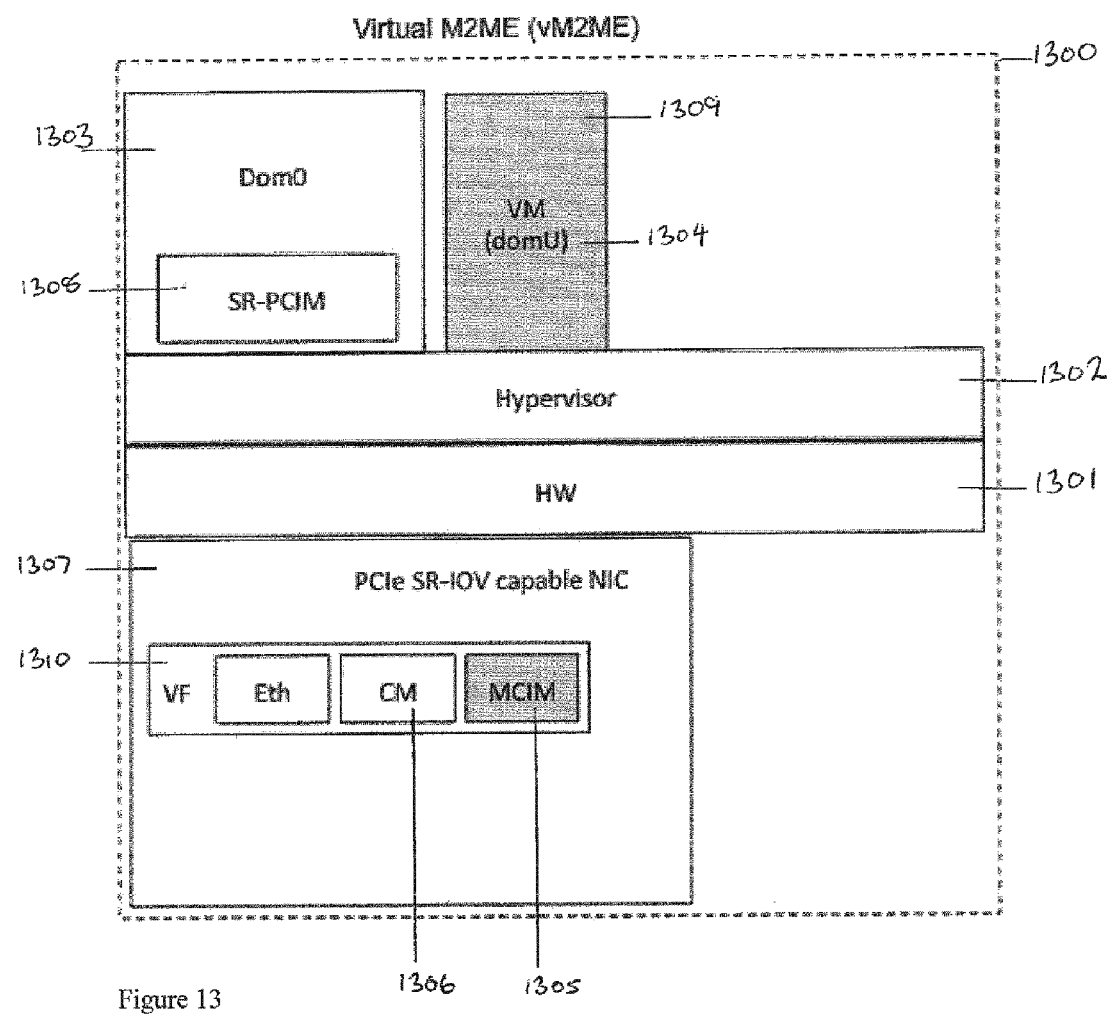
FIG. 13 is a schematic block diagram of a vM2ME.

In the scenario shown in FIG. 12 there is no Subscriber's VM, but instead the MNO's VM operates as a platform for its customers' certified services (processes). (A "certified" service is a service that is certified as being trustworthy and that will perform as intended—this is also known as "software assurance".) The MNO's certified VM is a service platform that is created by the MNO. The VM can host one or more MCIMs. The binding between services and MCIM takes place in the VM's Operating System (OS).

FIG. 12 illustrates the vM2ME 1200 using the layered concept as previously described. In this case a VMM or hypervisor 1202 of a third party's cloud platform resides on hardware 1201, and there is a TRE which is optionally based on a TPM 1208. The hypervisor 1202 supports a Dom0 1203 of the virtualization platform, as well as the MNO's VM 1207 (in DomU 1204). The MNO's VM 1207 includes a certified service 1208, a network interface controller 1209, and an operating system (OS) 1210 as well as one or more CM 1206 and associated MCIM 1205. (A network interface controller (also known as a "network interface card", "network adapter", "LAN adapter" and by similar terms) is a computer hardware component that connects a computer to a computer network.)

FIG. 12 also illustrates schematically how the conceptual structure of the vM2ME 1200 relates to the parties involved. In this scenario the third party's Cloud OS administrator 1211 operates the virtualization platform (vM2ME 1200) and the MNO owns the MNO-VM 1207, while the subscriber is the owner of the MCIM 1205, and subscribes to the certified services provided by the MNO-VM 1207. Thus, the MNO acts as a Selected Home Operator (SHO) for the services that are running in the third party's cloud.

In the scenario shown in FIG. 13, the vM2ME 1300 includes a pNIC 1307 (and therefore also a TRE), as well as a hypervisor 1302 on hardware 1301, and Dom0 1303, in which an Configuration Manager 1308 is installed. A VM 1309 executes in a DomU domain 1304 supported by the hypervisor 1302. In FIG. 13 a single execution environment (virtual function VF) 1310 is shown, although there may be multiple such execution environments in the pNIC 1307. Included in the VF 1310 are the CM 1306 and MCIM 1305 associated with the VM 1309.

In the scenarios of FIGS. 10(*c*) to 13, the MCIM+CM together form the 3GPP communication endpoint and act as a modem for the VM. The access used for connecting the MCIM+CM to the 3GPP network can be either 3GPP access as shown in FIG. 1 or non-3GPP access, of which the later is the more likely scenario. The non-3GPP access can be either trusted or untrusted non-3GPP access. The communication over these non-3GPP accesses works just as described in the 3GPP specifications (e.g. TS 23.401, TS 23.402).

The MCIM+CM can in addition to acting as a modem also perform NAT (network address translation) functionality if it is desirable that the VM maintains the same IP address when migrated. Alternatively the communication between the MCIM+CM and VM can also be pure L2 (OSI level 2) communication and the IP is taken care of by the MCIM+CM.

With the presented solution all traffic between the VM and e.g. a peer in the Internet will be routed via the 3GPP operator's network whose MCIM is used. This might lead to unoptimized routing if the VM is located in some other network than the 3GPP operators network. In this case it is possible to utilize local breakout to get direct access to the Internet from the VM.

The hypervisor in the virtualization environment sees to that the different resources of the VMs are isolated from each other. The isolation of MCIMs from VMs depends on how and where the MCIM+CM is run (as described in scenarios of FIGS. 10(c) to 13).

The presented solution can also be achieved by having a physical UICC instead of the MCIM in the host hosting the VM. However, this solution alternative has limitations e.g. related to mobility.

FIG. 2 illustrates one embodiment of the invention, in which a VM 201 that has an MCIM from the visited operator migrates from one SHO 205a to another SHO 205b. Each SHO 205a, 205b operates a respective cloud OS 202a,202b connected to the Internet 204 by a respective access network 203a,203b which may be a 3GPP network as shown in FIG. 2 or may be a non-3GPP network. Before migration the VM 201 is initially bound to an MCIM (MCIM1), and after migration it is bound to a new MCIM (MCIM 2) at the new SHO. It is assumed that, at the start, the VM is located in its home operators cloud (that is, the "old SHO" 205a is the home operator) cloud, and it is migrated to a cloud in a visited operator network (new SHO 205b).

The scope of this embodiment is to describe how virtual machines can migrate (inside or) between operators' data-centers utilizing the visited operator's MCIM (see 3GPP TR 33.812). The solution is based on P34573 which describes the essential parts of virtual M2ME integration with cloud operating system (OS) and 3GPP network.

Each virtual machine is associated with a 3GPP subscription, or multiple subscriptions (even if the access network is a non-3GPP access network). This allows VM migration between operators' data-centers and implement charging and security between operators with 3GPP infrastructure.

FIG. 3 shows the migration scenario. In outline, as noted above a VM and an MCIM form a vM2ME. In essence, before migration there is a first (original) vM2ME formed of the VM and a first MCIM. MCIM. This MCIM (belonging to the first operator) is disabled, blocked and optionally eventually destroyed in the migration process. During migration a new MCIM is provisioned (from the new network), and the VM is then migrated, thereby forming a new vM2ME (old VM+new MCIM).

When the currently serving SHO's cloud manager (that is, the manager of cloud 202a in FIG. 2, or the "old cloud manager") wants to move the VM to another cloud, it signals the target cloud (that is cloud 202b in FIG. 2) and requests resources for a new vM2ME from it (message 1). The request contains the requirements of the VM (e.g. the amount of memory required for the VM) and of the 3GPP Communication Module (CM). After migration, the new vM2ME will, together with a new MCIM (MCIM 2 of FIG. 2) form the migrated VM. After receipt of message 1, the new cloud manager (eg, the manager of cloud 202b in FIG. 2) allocates resources in the new cloud for the new vM2ME (not shown in FIG. 3).

Next the remote provisioning of the new MCIM takes place. An example of a procedure for this is described more fully below with reference to FIG. 9, steps 2-12, but in summary the new cloud manager either has a pool of preliminary MCIM credentials that it can use for new vM2MEs or it interacts with the new SHO to receive these credentials on a per vM2ME basis.

Once the new MCIM has been provisioned to the vM2ME in the new dom0, the result of this operation is signalled back to the old cloud manager (message 2).

If message 2 indicates that the new MCIM was successfully provisioned the old cloud manager starts migrating the VM to the new location. The VM migration process is effected by a hypervisor-based mechanisms that is a standard part of the XEN platform (or other similar platform).

After the VM has migrated to the new location, the old cloud manager signals the new cloud manager to activate the vM2ME (message 3a), and the new cloud manager in turn signals the dom0 of the new cloud to activate the vM2ME (message 4a). The new cloud manager activates the vM2ME by setting the MCIM to "active" and returns a status message to the old cloud manager (message 5a and 6a).

In parallel with message 3a, the old manager signals the dom0 of the old cloud (message 3b) that the vM2ME should be disabled. This also signals that the CM should tear down the connection to the 3GPP network (similar to power-off on a mobile phone), or alternatively inform the 3G network of pending handover (migration). (The action that CM takes depends on whether the same MCIM will be used in both the old and the new cloud—if the same MCIM will be used in both clouds there should be a handover. As explained below, however using the same MCIM credentials, and even session credentials, in different clouds is not a good solution as it has weak security.)

The old dom0 disables the vM2ME in the old cloud, and sends confirmation to the old cloud manager (message 4b).

The old manager also signals to the old SHO that the old MCIM associated with the VM should be moved to blocked state (message 5b). The old SHO sets the old MCIM to "blocked" state and then sends confirmation of this to the old cloud manager (message 6b) (and may possibly report cording the change to the associated DPF and DRF). The feature 5b ("block MCIM") informs the 3G operator to not allow this MCIM to be online again, until further notice. In effect, the CM can't just decide to "turn on" the vM2ME.

Should the migration fail, the old cloud manager would likely unblock the old MCIM and enable the old vM2ME so that the VM can return to run in the old cloud (not shown).

Message 6a sent from the new cloud manager may also include identification information for the new MCIM. The old cloud manager can use this information to maintain an association between the blocked MCIM left in the old cloud and the vM2ME in the new cloud.

If message 6a shows that activation of the vM2ME was successful, the old cloud manager signals the old dom0 to discard the old vM2ME associated with the VM in the old cloud (message 7). Upon receipt of this message the old dom0 discards the old vM2ME, and send confirmation to the old cloud manager (message 8).

Some time after the VM has been migrated from the "home" cloud 202a to the "visited" cloud 202b, it may be desired for the VM to be migrated back to the home cloud 202a. When/if the VM is to be migrated back to the home cloud 202a, a similar sequence of events to that depicted in FIG. 3 takes place—but the "old cloud manager" in FIG. 3 for the purpose of this second migration is the manager of the visited cloud 202b, and the "new cloud manager" in FIG. 3 for the purpose of this second migration is the manager of the home cloud 202a.

The principal difference between the first migration from the home cloud 202a to the visited cloud 202b and the second migration back from the visited cloud 202b to the home cloud 202 is that when the request for migration (message 1 in FIG. 3) reaches the manager of the home cloud 202a, the manager of the home cloud 202a can identify that the vM2ME to be migrated is one of its own VMs that was executing on the old cloud 202a before the first migration, and there is already an MCIM allocated to the VM which is now in a blocked state. The remote provisioning required in the second migration is then just re-establishing the vM2ME and returning the existing MCIM to the active state (or possibly re-provisioning the MCIM, if it was removed completely from dom0 after the first migration). After this, the second migration proceeds as in FIG. 3. The MCIM in the visited cloud 202a will be deleted after the VM has migrated back to the original cloud.

It is of course also possible that the old MCIM for the VM in the home cloud 202a is always destroyed when the VM is moved between clouds. In this case the old MCIM is never set into a blocked state but instead it is discarded. In this variant, step 5b in FIG. 3 is "remove MCIM" instead of "block MCIM".

As noted, the remote provisioning of the new MCIM shown in FIG. 3 may be carried out as shown in stages 2 to 12 of FIG. 9. (The remote provisioning of FIG. 9 is described more fully in P34691, to which attention is directed.) Stage 0 of FIG. 9 is not required in the process of FIG. 3, and stage 1 of FIG. 3 replaces stage 1 of FIG. 9.

In stages 2 to 12 of FIG. 9:

Stage 2 The SHO (ie, the "new" SHO of FIG. 3) transfers preliminary credentials for the VM, such as a preliminary MCIM, to the cloud manager, together with a request to set up a vM2ME. The cloud manager will usually be a $3^{rd}$ party cloud manager, in that the cloud manager is not the operator but is a third party providing cloud infrastructure to the operator.

Stage 3 The new cloud manager requests resources for a new VM from dom0 and also provides the preliminary MCIM to Dom0. (Requesting resources for a new VM implicitly also creates a new instance of a CM for the MCIM.)

Stage 4. Dom0 reserves the resources for a new vM2ME, installs the preliminary credentials to the TPM of the new cloud, and installs a new instance of the CM software module associated with the new preliminary MCIM. It then returns the allocation status to the cloud manager.

Stage 5. The CM allocated for the VM in question starts the bootstrapping process (similar to the process described in 3GPP TR 33.812) and connects to the DRF which will forward the request to the DPF (based on a registration performed, or existing, at the beginning of this flow—the registration can be an existing registration, i.e. not performed in connection with this migration, but there will always be registration information in the DRF and an MCIM in the DPF).

Stage 6. Before the DPF will allow the MCIM provisioning it will check that the TRE of the M2MEP is in a valid state. The DPF gives the PCID and TRE information to the selected home operator (SHO).

Stage 7. The home operator asks the PVA to validate the TRE of the M2MEP.

Stage 8. The PVA validates the TRE of the M2MEP and returns the result.

Stage 9. If the TRE was correctly validated, the SHO can now provision the subscriber MCIM. The SHO installs the subscriber MCIM in DPF.

Stage 10. The RO/DPF sends the subscriber MCIM to the new instance of the communication module (CM) established in stage 4 and running in Dom0.

Stage 11. After the subscriber MCIM has been installed in the CM, the dom0 signals the status of the installation to the DPF.

Stage 12. The CM with newly provisioned MCIM performs network attachment (e.g. a 3GPP attach procedure). Once successfully executed, it triggers the next message.

In stage 8 the PVA may validate the TRE using a "Trusted Third Party" (TTP) otherwise known as a "privacy certifying authority". There is a known attestation process in which a party, known as a "Challenger", sends a request for attestation to an "Attestator". The Attestator generates a public/private key pair, known as the attestation identity key (AIK), and send the public part to a TTP that is trusted by both the Attestator and the Challenger. The TTP generates an AIK certificate, signs the certificate, and sends the signed certificate to the Attestator. The Attestator sends the received AIK certificate to the Challenger, and the Challenger verifies the AIK certificate with the TTP public key (and may also carry out further verification steps). In stage 8 the PVA may act as the "Challenger" in a process of this type, and the Attestator is integrated with the trusted execution environment.

The embodiment of FIG. 2 may alternatively be used to migrate a VM between hosts in the same cloud. In this case, the new cloud manager and the old cloud manager shown in FIG. 3 are the same entities, and messages 1, 2, 3a and 6a are omitted. The VM is migrated from one host to another host in the same cloud rather than between clouds.

In the embodiment of FIG. 2, the existing 3GPP infrastructure does not need modifications. At any time, the then-current cloud operator provides Internet connectivity for the VM—so the home cloud operator provides Internet connectivity for the VM before the migration since the home cloud operator is the current cloud operator before the migration, and the visited cloud operator provides Internet connectivity for the VM after the migration to the visited cloud since the visited cloud operator is the current cloud operator after the migration. The advantage of this is that once the VM gets the network configuration (IP address) from the current cloud provider, packets sent to or from the VM are not routed via another operator's 3GPP network. The drawback is that the network configuration (IP-address) of the VM will change upon migration, and the VM must be aware of the network configuration (IP-address) change; also, clients connected to the VM at the time of the migration lose the active connections. It is possible that the operator that is maintaining the DNS entry for the subscriber's VM updates the DNS entry according to the VM migration.

3GPP TR 33.812 describes multiple lifecycle states of an MCIM, and specifies that an MCIM should be able to exist in any one of the following lifecycle states:

"Installed": an instance of a MCIM has been created and has an entry in the M2ME's registry;

"Activated": an instance of the MCIM is authorised for operational use.

"Selected": this state marks the commencement of a session with a MCIM. Only an activated MCIM can be selected. When the session ends, the MCIM reverts to the Activated state.

"Blocked": an instance of a MCIM has been temporarily de-activated and is not available for use. An example of this is when the status of an application-specific PIN becomes "blocked". Unblocking of an MCIM causes it to be restored to the Activated state.

"Retired": an instance of a MCIM that is permanently unavailable for use, but is still instantiated in the M2ME. An example of this is where a credential is permanently deleted but some executable components of the MCIM that are used by other applications are still active.

"Deleted": a MCIM is permanently removed from the M2ME's memory. Deletion may be applied to a MCIM that is in any of the above lifecycle states except for the Selected state.

These lifecycle states are valid also in the case of a telecommunications operator's cloud. Some clarification is needed for the case when a VM is temporarily migrated from its home SHO's cloud (the cloud where it is installed) to another SHO's cloud, as in FIG. 2. In this case the MCIM in the home SHO's cloud can either go to Activated or Blocked state. Of these, "blocked" is the preferred state since this indicates that the MCIM in the home SHO's cloud should not be used. When the VM is migrated back to the home SHO's cloud, the MCIM should again go to the "Activated" state (and then to the "selected" state).

While the VM is temporarily located in the visited cloud its MCIM will there be in the "Activated" or "Selected" state when active. The MCIM in the visited cloud is not the same MCIM as in the home SHO's cloud but is a new MCIM to be used only in the temporarily visited cloud. The MCIM in the visited cloud may be provisioned using regular provisioning methods, by using a different PCID compared to the one used in the home SHO's cloud. From the temporarily visited cloud's point of view, the VM is just another VM with the exception of the migration process of transferring the suspended VM image from the home SHO's cloud to this cloud.

The management aspects of "roaming" a VM image from one operator to another by changing the MCIM (SIM), instead of treating the new cloud provider as a visited operator, falls on the cloud providers involved in the migration and is taken care of by service level agreements (SLAs). These management aspects may be at least partially solved by e.g. utilizing special SLAs between operators regarding charging in VM migration cases and using local breakout so as to not have to route all traffic via the home SHO network.

It should be noted that where the method of FIG. 2 is used to migrate a VM between different hosts in the same cloud, it would in principle be possible for the VM to reuse the same MCIM credentials after migration. If a VM is migrated between different operators and the new operator were to re-use the same MCIM credentials as used in the old operator's network there is potentially a security problem, so providing a new MCIM upon migration to a new operator is preferred, as explained above. However, security is less of a problem for a migration where there is no change in operator.

The contents of the MCIM in a cloud scenario does not differ from any other MCIM scenario.

In the embodiment of FIG. 2, the VM is given a new MCIM by the visited cloud upon migration. In an alternative embodiment, shown in FIG. 4, the VM always has an MCIM from the same operator, even after migration. This can provide seamless connectivity when a VM is migrated between clouds, allows VM migration inside and between different data-centers, and makes it possible to implement charging and security for VM's traffic using 3GPP infrastructure.

This alternative embodiment describes how virtual machines can migrate within (ie, from host to another) or between different 3$^{rd}$ party/operator data-centers while still using an MCIM from a preferred SHO (3GPP TR 33.812). The solution is based on the method described in P34573, to which attention is directed, in particular on the description therein of virtual M2ME integration with cloud operating system (OS) and 3GPP network.

FIG. 4 shows an SHO 401 that operates an access network such as a 3GPP network 402 that provides connectivity to the Internet 403. The SHO 401 can operate a VM 404 under a contract with a subscriber and provision it with an MCIM, but, unlike the case in FIG. 2, the VM does not (or need not) execute on a cloud operated by the SHO 401. Instead, the SHO 401 has a contract with other operators 405A, 405B for the provision of computing cloud resources (two operators 405A, 405B operating a respective cloud 406A, 406B are shown in FIG. 4, but the invention is not limited to two operators). The clouds 406A, 406B of operators 405A, 405B are connected to the SHO by a suitable access network, for example a 3GPP network 407A, 407B.

FIG. 4 illustrates the case where the VM is currently running on a cloud 406A of Operator A (405A), and it is desired to migrate the VM to run on a cloud 406B of Operator B (405B)—that is, the VM is to be migrated from one visited operator to another visited operator. This embodiment lets the VM maintain the same network configuration (including IP address) even when migrated with the trade-off of triangular routing between hosts in the Internet and the VM.

The following discussion will focus on the scenario of migrating a VM between cloud providers that are different than SHO. The migration scenarios presented in this document are shown in FIGS. 4 to 7.

In the embodiment of FIG. 4 the VM migrates ("roams") via the 3GPP networks 407A,407B from one visited operator's cloud to another visited operator's cloud. In FIG. 4, the VM is initially bound with a first MCIM (MCIM-1) and after the migration is bound with another MCIM (MCIM-2). Both MCIM-1 and MCIM-2 are provisioned by the SHO 401. Traffic to/from the VM is routed via SHO's 3GPP network, both before and after migration of the VM.

That is, in the embodiment of FIG. 4 it is always the same SHO that provides MCIMs to the vM2ME, even when it is migrated to another operator's cloud. This allows "traditional" roaming agreements for VMs between operators. Unless local breakout to Internet is used for the VM in the visited 3GPP network, all traffic to/from the VM is routed via the home operator's network. (Special SLAs may be agreed between 3GPP operators for this kind of VM migration to handle data roaming.)

The VM will always get an IP address from the SHO's network. By suitable configuration (eg, provide a permanent IP address for the subscription and utilizing the mapping information between the various MCIMs and the subscriber) it is possible to let the VM always have the same network configuration. This will mean that no DNS updates are needed to keep the services reachable and active; i.e., the VM will always have the same Point of Presence (PoP) in the network. This is depicted in FIG. 5. A client may access the VM though the Internet via the SHO, regardless of which cloud operator is currently executing the VM, as the SHO is able to route traffic from the client to the VM (and vice versa) to the cloud operator currently executing the VM. The PoP of the VM is always in the SHO, regardless of which cloud operator is currently executing the VM In contrast, the embodiment of FIG. 2 may have routing problems upon migration as described above. This is shown in FIG. 6, which illustrates that the PoP of the VM is the cloud operator currently executing the VM. Thus, the PoP of the VM changes when the VM migrates from one cloud operator to another.

FIG. 7 shows an example of signalling required to implement the embodiment of FIG. 4. This builds largely on the bootstrapping mechanism shown in FIG. 9.

Stage 1 The VM is currently executing in one cloud, for example cloud 406A of FIG. 4. The SHO decides it would like to move the VM to a new execution environment, for example in another cloud, and decides on the identity of the new execution environment. The decision may be the result of the SHO receiving a request, for example from the subscriber, for a new execution environment for the VM, and if so the request may contain an indication of which target cloud is requested, for example cloud 406B of FIG. 4. (The SHO may have multiple cloud operators with which it has SLAs for migrating VMs.) Alternatively, the SHO may receive a request that just asks for a new execution environment for the VM without specifying any particular target cloud, in which case the SHO can choose a new execution environment from the alternatives available to it. As a further alternative, the SHO may decide on a new execution environment for the VM without receiving a request, and possibly even without knowledge by the subscriber.

Next the SHO signals the target cloud (that is cloud 406B in FIG. 4) and requests resources for a new vM2ME from it. The request contains the requirements of the VM (e.g. the amount of memory required for the VM) and of the 3GPP Communication Module (CM).

Next, remote provisioning of an MCIM for the vM2ME in the new cloud occurs. This is essentially the same sequence as shown in FIG. 9, steps 0, 2-11. Since, in the embodiment of FIG. 7, the MCIM is always provided by the SHO, the remote provisioning of the MCIM takes place between the SHO and the new cloud.

Stage 2 Once the new MCIM has been provisioned to the vM2ME in the new dom0, the Communication Module of the new cloud performs a 3GPP network attach (corresponding to stage 9 of FIG. 9). This acts as a signal to the SHO that the MCIM has been provisioned successfully.

Figure 18:
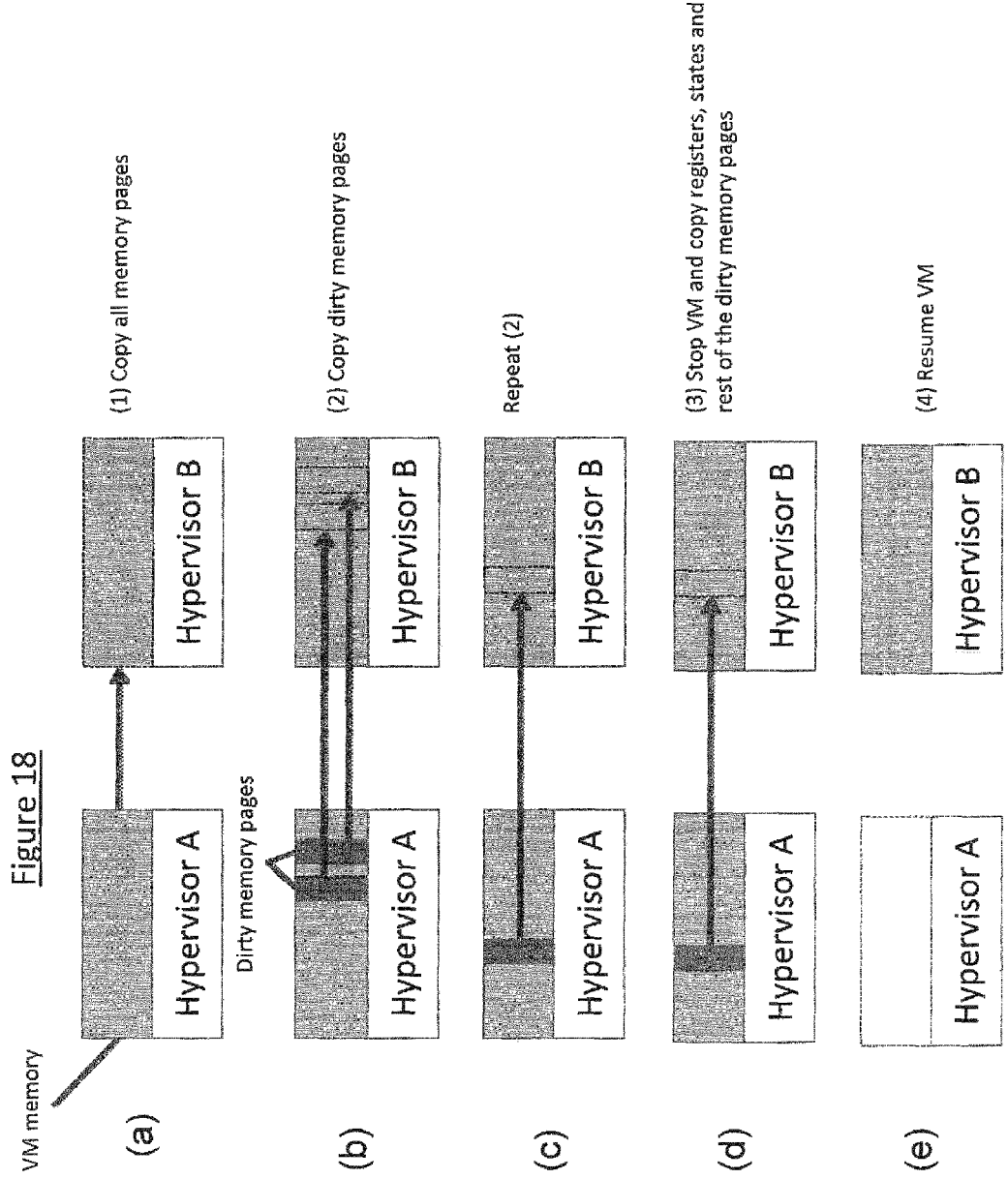
FIG. 18 is a schematic block diagram of a known live migration method for migrating a VM.

Stage 3 The SHO now signals the old cloud manager that the vM2ME CM is running and that the VM can be transferred. As a result of this message the old cloud manager transfers (migrates) the VM to the new cloud manager. The VM migration may be done by any suitable method, for example by a method as generally described in FIG. 18, by another pre-copy migration method or by a post-copy migration method.

Stage 4 When the migration is completed, the old cloud manager signals the SHO that the associated old MCIM should be moved to the "blocked" state.

Stage 5 The SHO requests the new cloud manager to activate the vM2ME in the new cloud.

Stage 6 The vM2ME is configured and VM is started. For example, the management domain (new dom0) may be requested to start the VM, and have the CM use the MCIM (from the vM2ME) to set-up a connection to the 3GPP network. In addition this stage also sets-up the network connection of the VM such that the VM's traffic goes to the 3GPP network—in practice, this is done by creating a virtual network interface that is bound to the VM and whose other end is tunneled to the 3G network. (Details of the tunneling are described in P34573.)

Stage 7 When the vM2ME is running in the new cloud, the new dom0 informs the new cloud manager that the vM2ME is running in the new cloud.

Stage 8 The new cloud manager provides the status to the SHO.

Stage 9 In parallel with messages 5-8, the old cloud manager signals the old dom0 that the vM2ME in the old cloud should be disabled Stage 10 After disabling the vM2ME in the old cloud, the Old dom0 provides the status to the old cloud manager.

Stage 11 If message 8 indicates that the new vM2ME is running successfully, the SHO signals to the old cloud manager to discard the vM2ME in the old cloud.

Stage 12 The old cloud manager signals the old dom0 to discard the vM2ME in the old cloud.

Stage 13 After discarding the vM2ME in the old cloud, the Old dom0 returns the status to the old cloud manager.

Stage 14 The old cloud manager returns the status to SHO.

As with the embodiment of FIG. 2, the embodiment of FIG. 4 may alternatively be used to migrate a VM between hosts in the same cloud. In this case the SHO requests reservation of the new vM2ME on a new host in the same cloud where the VM is currently executing, the new cloud manager and the old cloud manager shown in FIG. 7 are the same entities, and the VM is migrated from one host to another host in the same cloud rather than between clouds.

In the embodiment of FIGS. 4 and 7, the lifecycle of MCIM is very similar to the lifecycle described above for the embodiment of FIG. 2.

3GPP TR 33.812 describes multiple lifecycle states of an MCIM. They are valid also in the telco cloud case. Some clarification is needed for the case when a VM is temporarily migrated from its current cloud (the cloud where it is currently installed, eg cloud 406A of FIG. 4) to another cloud. In this case, the MCIM provisioned for the VM in the original cloud can go to a "blocked" state or be discarded.

The "blocked" state indicates that the MCIM for the original cloud should not be used. When/if the VM is migrated back to the original cloud (eg, undergoes a further migration back to the cloud 406A of FIG. 4) a similar sequence of events takes place to that depicted in FIG. 7 and the MCIM should again go to "Activated" state (and then to the "selected" state). The difference in FIG. 7 is that when the request for the further migration reaches the old cloud, the old cloud manager can identify that the vM2ME to be migrated is one of its managed vM2MEs and there is already an MCIM allocated—which is in the "blocked" state. The remote provisioning is then just re-establishing the vM2ME and moving the existing MCIM to the "active" state (or possibly re-provisioning the MCIM if it had been removed from dom0).

It is also possible that the MCIM is always replaced with a new one when the VM image is moved between clouds. In this case an MCIM is never set into the "blocked" state when the VM is migrated but instead it is discarded. This means that step 5 in FIG. 7 becomes "remove MCIM" instead of "block MCIM". Discarding the MCIM also includes removing it from the SHO/RO (Registration Operator). In other words, the MCIM in a visited cloud will be deleted after the VM has migrated away from that cloud.

While the VM is located in the other cloud, eg cloud 406B, its MCIM there will be in the "Activated/Selected" state when the VM is active. The MCIM in the other cloud 406B is not the same MCIM as in the previous cloud 406A, but is a new MCIM to be used only in the other cloud 406B. The provisioning of this MCIM (between stage 1 and stage 2 of FIG. 7) may follow regular provisioning methods using a PCID allocated by the same SHO. The PCID may remain the same after migration to make it simpler to map MCIMs with the VM during migration.

From a temporarily visited cloud's point of view, the VM is just another VM with the exception of the migration process of transferring the suspended VM image from the original cloud to this cloud. The contractual aspects of "roaming" VM image from one operator to another fall on the involved cloud providers and the SHO and are taken care of by SLAs.

As an alternative to a VM always being provided with a new MCIM in each visited operator network, it would be possible that the VM always has the same MCIM (as long as the subscription is valid) regardless of which operator the VM is visiting. This would be similar to regular mobile phone roaming when going abroad, and could be implemented by always associating the PCID to the same MCIM.

In practice, this would mean that while roaming there would be 2 or more copies of the MCIM downloaded. For the example of FIG. 4 there would be one copy of the MCIM downloaded at the cloud 406A that originally hosted the VM (with the MCIM in the "blocked" state), and another copy of the MCIM downloaded at the cloud 406B currently hosting the VM (with the MCIM in the "active" state). This would make the charging aspects of roaming the VM easier as it would follow regular roaming charging principles (although this approach has possible drawbacks; for example, the credentials of the VM would be shared between multiple operators).

The presented solution has a number of advantages. For example it utilizes existing 3GPP standards to provide a secure way of migrating VMs between physical machines of one cloud provider or even between one cloud provider and a different cloud provider. In the embodiment of FIG. 2 the current (visited) operator offers direct Internet connectivity for the VM, thus eliminating the triangular routing via home operator and minimizing latency for Internet clients. In the embodiment of FIG. 4, the VM can maintain the same network configuration (including its public IP address) regardless of which cloud it is migrated to—with the result that the VM will always be reachable at the same point-of-presence in the network. In addition, existing 3GPP charging mechanism can be applied to the VM roaming between operators' data-centers.

From a customer's point of view the provided solution is very simple; the customer purchases resources for a VM from a single cloud operator. After that, the resource allocation, etc., are done by the cloud operator, and the customer does not need to do anything special compared to other cloud solutions.

The extent to which a VM can be migrated may be controlled, to some extent, by the customer. For example the customer may make an SLA with the cloud operator. The SLA may define limits on the possible migration—for example, the SLA may state that the VM can be migrated to a certain set of visited operator data-centers. As a further example, the SLA may allow VMs to migrate based on peak hours and established migration/"roaming" agreements between operators. The existing 3GPP roaming SLAs can be re-used. As a side the 3GPP specifications define also security protection for control traffic between home and visited operator networks. These security associations can be used to secure VM migration.

If such an SLA is made the cloud provider (who for example may be based in Europe) can make SLAs with other operators (e.g. one in North America and one in Asia) and seamlessly move around a subscriber's VM(s) based on the load in the cloud provider's own network. This means that, for example, during peak hours for the cloud provider's own network some VMs can be moved to other parts of the world where it is night or where for some other reason there are free resources. Also, there might not even be a need for such SLAs between operators but instead the operators could provide cloud services to each other for a certain fee, like a business-to-business service.

The 3GPP architecture and standards already define many security features that will make this kind of service easy to deploy by MNOs. The cloud providers can e.g. directly utilize the QoS and charging functions found in the 3GPP networks. Also, this gives the MNOs a new clear business/service role which moves them away from becoming only bit-pipe providers in cloud business.

FIG. 14 is a block flow diagram showing the principal steps carried by an old cloud manager in a method of the invention. At step 1403 the old cloud manager initiates migration of a VM, currently executing on an old vM2ME within the old cloud, to a new execution environment. The new execution environment may be within a new cloud, or it may be a new host within the old cloud. Once the migration is complete, the cloud manager disables (step 1404) the old vM2ME.

Before the migration at step 1403, the cloud manager may send (step 1401) a request for a new vM2ME to a new cloud manager, in a case where the new execution environment is within a new cloud. In this case the new cloud manager will provision a new MCIM for the VM in the new cloud, and the old cloud manager initiates migration (step 1402) provisioning of the new MCIM.

After the migration at step 1403, the cloud manager may instruct (step 1405) the new cloud manager to activate the new vM2ME, again in a case where the new execution environment is within a new cloud.

Once the VM is running in the new execution environment, the cloud manager may discard (step 1406) the old vM2ME (already disabled at step 1404), thereby releasing the resources committed to the old vM2ME for re-use. The cloud manager may also block or discard the old MCIM associated with the VM (step 1407).

FIG. 15 is a block flow diagram showing the principal steps carried by a "new" cloud manager in a method of the invention in which a VM is migrated from an execution environment within one cloud to a new execution environment within another cloud. At step 1501 the new cloud manager receives a request for a new vM2ME for a VM; the request is from the cloud manager that is managing the cloud within which the VM is currently executing. In response to the request, the new cloud manager initiates provisioning of a new MCIM for the VM (step 1502). The new cloud manager also reserves resources for a new vM2ME for the VM. Subsequently, after the VM has been migrated to the new cloud, the new cloud manager activates the new vM2ME (step 1505).

The new cloud manager may further report (step 1503) to the old cloud manager when provisioning of the new MCIM is complete. The activation of the new vM2ME at step 15035 may be consequent to the receipt (step 1504) of an instruction from the old cloud manager to activate the new vM2ME.

The new cloud manager may further report (step 1506) to the old cloud manager when activation of the new vM2ME is complete.

FIG. 16 is a block flow diagram showing the principal steps carried by the SHO in the method of FIGS. 4 and 7. At step 1602 the SHO decides to initiate migration of a VM, currently executing on an "old" vM2ME within an "old" cloud, to a new execution environment. The new execution environment may be within a new cloud, or it may be a new host within the old cloud. The SHO may make the decision following receipt (step 1601) of a request for a new execution environment, or it may make the decision even in the absence of such a request.

The SHO then provisions (step 1603) an MCIM for the VM in the new execution environment, and also sends a request for reservation of resources for a new vM2ME for the VM in the new execution environment.

Once the SHO receives confirmation that the MCIM has been provisioned for the VM in the new execution environment, the SHO instructs (step 1604) the cloud manager of the cloud where the VM is currently executing to migrate the VM to the new execution environment Following confirmation that the VM has been migrated to the new execution environment, the SHO may then instruct (step 1605) the cloud manager of the cloud containing the new execution environment, eg the new cloud manager, to activate the new vM2ME.

The SHO may also block or discard (1606) the MCIM associated with the VM in the old execution environment, following confirmation that the VM has been migrated to the new execution environment.

Once the VM is running in the new execution environment, the SHO may discard (step 1607) the old vM2ME, thereby releasing the resources committed to the old vM2ME for re-use.

Figure 17:
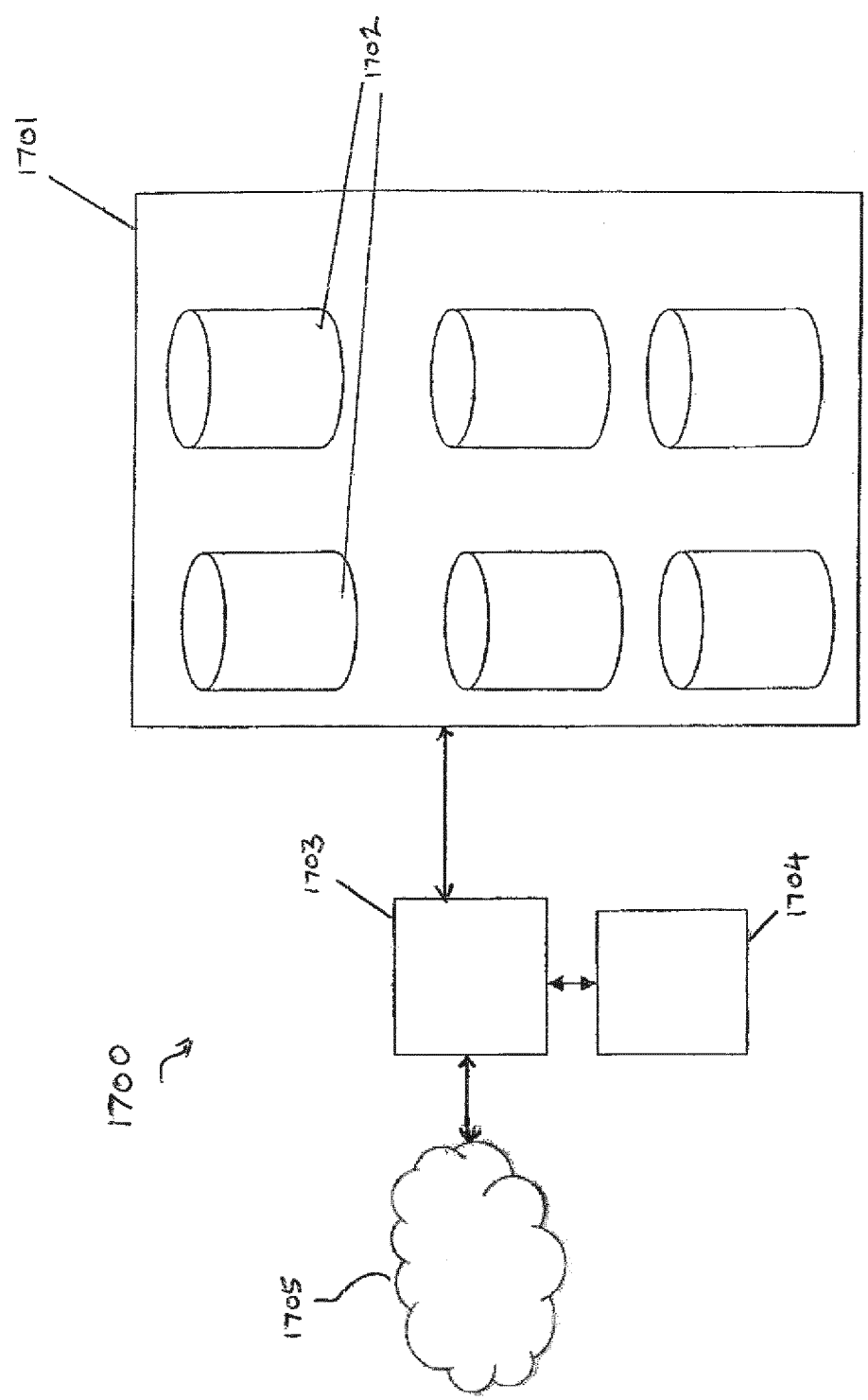
FIG. 17 is a schematic block flow diagram of a node according to an embodiment of the present invention.

FIG. 17 is a schematic block diagram of a telecommunications network entity 1700 embodying the present invention. FIG. 17 shows an example where the telecommunications network entity 1700 is a manager of a distributed computing environment 1701 containing a plurality of servers 1702. For example, the distributed computing environment 1701 may be a computing cloud, and the telecommunications network entity 1700 may be the cloud manager of the cloud 1701 and so may control what happens in virtualisation platforms in the cloud 1701. The telecommunications network entity may receive jobs for execution on the cloud 1701 from a user via the Internet (not shown) and a suitable access network 1705 such as a 3GPP network, and schedule the jobs on one or more servers 1702 of the cloud 1701

The telecommunications network entity 1700 contains a server 1703 that operates according to computer program code or instructions contained on a computer-readable medium 1704 such as a magnetic disc or an optical disc.

The telecommunications network entity 1700 may operate one or more VMs on servers of the cloud. The computer-readable medium 1704 may cause the server 1703 to perform a method of the invention for migrating a VM from one of the servers 1702 of the cloud 1701 to another of the servers 1702 of the cloud 1701, and/or to perform a method of the invention for migrating a VM from one of the servers 1702 of the cloud 1701 to another cloud (not shown in FIG. 17), and/or to perform a method of the invention for migrating a VM from another cloud (not shown in FIG. 17) to one of the servers 1702 of the cloud 1701.

APPENDIX

The following abbreviations are used in this application:

PVA: Platform Validation Authority. According to 3GPP TS 33.812, Section 5.1.3.5.8: "The PVA is the authority responsible for validating the credentials used to verify the M2M equipment as a trusted platform. The PVA may also issue these credentials. The PVA supports the following:

Validation of platform credentials that assert the authenticity and integrity of the M2ME as a platform to hold the MCIM application and credentials;

Providing the DPF and SHO with information related to the success or failure of the validation of the M2ME.

Obtaining new platform credentials when required, e.g. after a remote update of the M2ME.

The content and format of a Platform Credential (PfC) can have, e.g. the following variations. PfC may contain several parts some of which are device-specific and some common to a group of devices. E.g., (1) an M2M ES public key to act as the root of trust for verification (public, common), (2) a device-specific private key stored in the M2ME (secret, device-specific), (3) a certificate issued to the corresponding public key by the M2M ES (public, device-specific) asserting the expected system state of the M2ME. In this scenario, PfC needs to be obtained by PVA in advance of the manufacture in a secure manner; is embedded or initialized in the M2ME during manufacture; and can be provided along with other information during platform validation."

The invention claimed is:

1. A method of migrating a virtual machine, the method comprising, at a first manager that is managing a first computing environment:

initiating migration of a virtual machine (VM) that is currently executing on a first virtual machine-to-machine equipment (vM2ME) in the first computing environment to a second computing environment, wherein the first vM2ME in the first computing environment is a virtualization platform comprising the VM and a first Machine Communication Identity Module (MCIM), and wherein the first MOM is a downloadable subscriber identity module that is configured to authenticate a subscriber that is associated with the VM to a 3GPP network and enable communication with the 3GPP network; and disabling execution of the first vM2ME.

2. The method as claimed in claim 1 wherein the second computing environment is managed by a second manager that is different from the first manager.

3. The method as claimed in claim 2 and further comprising, subsequent to migration of the virtual machine to the second computing environment, the first manager instructing the second manager to activate a second vM2ME in the second computing environment.

4. The method as claimed in claim 1 and comprising, before initiating migration of a virtual machine:

the first manager sending a request for establishment in the second computing environment of a second vM2ME for execution of the VM.

5. The method as claimed in claim 1 and comprising the first manager initiating migration of the virtual machine subsequent to receipt of confirmation that a second Machine Communication Identity Module (MCIM) has been provisioned for the virtual machine in a virtual management domain in the second computing environment.

6. The method as claimed in claim 1 and further comprising the first manager initiating releasing of the first virtual machine-to-machine equipment that is provisioned for the virtual machine in the first computing environment.

7. The method as claimed in claim 1 and further comprising the first manager instructing an operator that is associated with the first computing environment to block the first Machine Communication Identity Module (MCIM) that is associated with the virtual machine in the first computing environment.

8. The method as claimed in claim 1 and further comprising the first manager instructing an operator that is associated with the first computing environment to discard the first Machine Communication Identity Module (MCIM) that is associated with the virtual machine in the first computing environment.

9. A method of migrating a virtual machine, the method comprising:

receiving, at a second manager managing a second computing environment, a request to migrate to the second computing environment a virtual machine that is currently executing on a first computing environment managed by a first manager and utilizing a first Machine Communication Identity Module (MOM), wherein the first MCIM is a downloadable subscriber identity module that is configured to authenticate a subscriber that is associated with the virtual machine to a 3GPP network and enable communication with the 3GPP network;

initiating by the second manager, the provisioning of a second MCIM for executing the virtual machine in the second computing environment; and the second manager instructing activation of the virtual machine in the second computing environment.

10. The method as claimed in claim 9 wherein the second MCIM for executing the virtual machine in the second computing environment is provisioned in a virtual management domain in the second computing environment.

11. The method as claimed in claim 9 wherein the first manager is different from the second manager.

12. The method as claimed in claim 11 and further comprising the second manager informing the first manager of the provisioning of the second MCIM for the virtual machine.

13. The method as claimed in claim 11 wherein the second manager instructs activation of the virtual machine in the second computing environment responsive to receipt of an instruction from the first manager.

14. The method as claimed in claim 13, wherein the second manager instructs a virtual management domain in the second computing environment to activate the virtual machine, and wherein the second MCIM for executing the virtual machine in the second computing environment is provisioned in the virtual management domain in the second computing environment.

15. The method as claimed in claim 11 and comprising the second manager informing the first manager of the activation of the virtual machine in the second computing environment.

16. The method as claimed in claim 9 wherein the 3GPP network for which the first MOM is configured is a first 3GPP network,
wherein the second MCIM is configured to authenticate the subscriber that is associated with the virtual machine to a second 3GPP network and enable communication with the second 3GPP network, and
wherein the first 3GPP network and the second 3GPP networks are different from one another.

17. The method as claimed in claim 9 further comprising:
executing the virtual machine in the second computing environment, wherein the virtual machine that is executing in the second computing environment retains a same network configuration as when the virtual machine was executing in the first computing environment.

18. A method of migrating a virtual machine, the method comprising:
requesting, at a home operator, a new execution environment for a virtual machine that is currently being executed on a first computing environment, the virtual machine being associated with the home operator;
initiating, by the home operator, provisioning of a second Machine Communication Identity Module (MCIM) for execution of a second virtual machine-to-machine equipment (vM2ME) for the virtual machine on a second computing environment that is different from the first computing environment,
wherein the second vM2ME is a virtualization platform for the virtual machine on the second computing environment comprising the virtual machine and the second MCIM, and
wherein the second MCIM is a downloadable subscriber identity module that is configured to authenticate a subscriber that is associated with the virtual machine to a 3GPP network and enable communication with the 3GPP network; and
upon receipt by the home operator of confirmation of provisioning of the second MCIM, the home operator instructing a first manager that is managing the first computing environment to migrate the virtual machine to the second computing environment.

19. The method as claimed in claim 18, wherein, at the time of the request for the new execution environment for the virtual machine, the virtual machine is associated with a first MCIM that is provided by the home operator for execution of the virtual machine in the first computing environment.

20. The method as claimed in claim 19, and further comprising, after the virtual machine has been migrated to the second computing environment, the home operator blocking the first MCIM that is provided by the home operator for execution of the virtual machine in the first computing environment.

21. The method as claimed in claim 18 wherein the second computing environment is managed by a second manager that is different from the first manager.

22. The method as claimed in claim 21 and comprising the home operator instructing the second manager to activate the virtual machine in the second computing environment.

23. The method as claimed in claim 22 and comprising, after activation of the virtual machine in the second computing environment, the home operator instructing the first manager to discard a first virtual machine-to-machine equipment that is provisioned for the virtual machine in the first computing environment.

24. A telecommunications network entity configured to migrate a virtual machine, the network entity comprising a processor and memory storing programming instructions that, when executed by the processor, cause the network entity to:
initiate migration of a virtual machine that is currently executing on a first virtual machine-to-machine equipment (vM2ME) in a first computing environment and utilizing a first Machine Communication Identity Module (MCIM), which is managed by the network entity, to a second computing environment,
wherein the first vM2ME is a virtualization platform for the virtual machine on the first computing environment comprising the virtual machine and the first MCIM, and
wherein the first MCIM is a downloadable subscriber identity module that is configured to authenticate a subscriber that is associated with the virtual machine to a 3GPP network and enable communication with the 3GPP network; and
disable execution of the virtual machine on the first computing environment.

25. The telecommunications network entity as claimed in claim 24 wherein the instructions further cause the network entity to, before initiating migration of the virtual machine:
send a request for establishment in the second computing environment of a second vM2ME for execution of the virtual machine.

26. The telecommunications network entity as claimed in claim 25 wherein the instructions further cause the network entity to, responsive to migration of the virtual machine to the second computing environment, instruct the second manager to activate the second vM2ME in the second computing environment.

27. The telecommunications network entity as claimed in claim 24 wherein the instructions further cause the network entity to initiate migration of the virtual machine responsive to receipt of confirmation that a second MCIM has been provisioned for the virtual machine in a virtual management domain in the second computing environment.

28. The telecommunications network entity as claimed in claim 24 wherein the instructions further cause the network entity to initiate releasing of the first virtual machine-to-machine equipment that is provisioned for the virtual machine in the first computing environment.

29. The telecommunications network entity as claimed in claim 24 wherein the instructions further cause the network entity to instruct an operator that is associated with the first computing environment to block the first MCIM that is associated with the virtual machine in the first computing environment.

30. The telecommunications network entity as claimed in claim 24 and wherein the instructions further cause the network entity to instruct, an operator that is associated with the first computing environment to discard the first MCIM that is associated with the virtual machine in the first computing environment.

31. A telecommunications network entity configured to migrate a virtual machine, the network entity comprising a processor and memory storing programming instructions that, when executed by the processor, cause the network entity to:
  receive a request to migrate, to a computing environment that is managed by the network entity, a virtual machine that is currently executing on another computing environment managed by another manager and utilizing a first Machine Communication Identity Module (MCIM),
    wherein the first MCIM is a downloadable subscriber identity module that is configured to authenticate a subscriber that is associated with the virtual machine to a 3GPP network and enable communication with the 3GPP network;
  initiate the provisioning of a second MCIM for executing the virtual machine in a computing environment that is managed by the network entity; and
  instruct activation of the virtual machine in the computing environment that is managed by the network entity.

32. The telecommunications network entity as claimed in claim 31 wherein the instructions further cause the network entity to initiate provisioning of the second MCIM for executing the virtual machine in a virtual management domain in the computing environment.

33. The telecommunications network entity as claimed in claim 31 wherein the instructions further cause the network entity to inform the another manager of the provisioning of the second MCIM for the virtual machine.

34. The telecommunications network entity as claimed in claim 31 wherein the instructions further cause the network entity to instruct activation of the virtual machine in the computing environment responsive to receipt of an instruction from the another manager.

35. The telecommunications network entity as claimed in claim 34 wherein the instructions further cause the network entity to instruct a virtual management domain in the computing environment to activate the virtual machine, and wherein the instructions further cause the network entity to initiate provisioning of the MCIM for executing the virtual machine in the virtual management domain in the computing environment.

36. The telecommunications network entity as claimed in claim 31 wherein the another manager is different from the network entity, and wherein the instructions further cause the network entity to inform the another manager of the activation of the virtual machine in the computing environment.

37. A telecommunications network entity configured to manage a virtual machine, the network entity comprising a processor and memory storing programming instructions that, when executed by the processor, cause the network entity to:
  request a new execution environment for a virtual machine that is currently being executed on a first computing environment, the virtual machine being associated with the network entity;
  initiate provisioning of a second Machine Communication Identity Module (MCIM) for a second virtual machine-to-machine equipment (vM2ME) for execution of the virtual machine on a second computing environment that is different from the first computing environment,
    wherein the second vM2ME in the second computing environment is a virtualization platform comprising the virtual machine and the second MCIM, and
    wherein the second MCIM is a downloadable subscriber identity module that is configured to authenticate a subscriber that is associated with the virtual machine to a 3GPP network and enable communication with the 3GPP network; and
  instruct, upon receipt by the network entity of confirmation of provisioning of the second MCIM, a first manager that is managing the first computing environment to migrate the virtual machine to the second computing environment.

38. The telecommunications network entity as claimed in claim 37, wherein, at the time of the request for the new execution environment for the virtual machine, the virtual machine is associated with a first MCIM that is provided by the home operator, wherein the first MCIM is different from the second MCIM, and wherein the instructions further cause the network entity to block the first MCIM after the virtual machine has been migrated to the second computing environment.

39. The telecommunications network entity as claimed in claim 37 wherein the second computing environment is managed by a second manager that is different from the first manager, and wherein the instructions further cause the network entity to instruct the second manager to activate the virtual machine in the second computing environment.

40. The telecommunications network entity as claimed in claim 39 wherein the instructions further cause the network entity to, after activation of the virtual machine in the second computing environment, instruct the first manager to discard a first virtual machine-to-machine equipment provisioned for the virtual machine in the first computing environment.

* * * * *

UNITED STATES PATENT AND TRADEMARK OFFICE
CERTIFICATE OF CORRECTION

PATENT NO. : 9,286,100 B2  
APPLICATION NO. : 14/368360  
DATED : March 15, 2016  
INVENTOR(S) : Salmela et al.

Page 1 of 1

It is certified that error appears in the above-identified patent and that said Letters Patent is hereby corrected as shown below:

In the claims,

In Column 26, Line 5, in Claim 1, delete "MOM" and insert -- MCIM --, therefor.

In Column 26, Line 53, in Claim 9, delete "(MOM)," and insert -- (MCIM), --, therefor.

In Column 27, Line 21, in Claim 16, delete "MOM" and insert -- MCIM --, therefor.

In Column 29, Line 3, in Claim 30, delete "instruct," and insert -- instruct --, therefor.

Signed and Sealed this
Fourteenth Day of June, 2016

Michelle K. Lee
*Director of the United States Patent and Trademark Office*